United States Patent Office 3,583,998
Patented June 8, 1971

3,583,998
BASIC DYES
Roland Entschel, Basel, Curt Mueller, Binningen, Basel-Land, and Walter Wehrli, Riehen, Basel, Switzerland, assignors to Sandoz Ltd., also known as Sandoz AG, Basel, Switzerland
No Drawing. Division of application Ser. No. 545,776, Apr. 27, 1966, now Patent No. 3,515,733, which is a continuation-in-part of applications Ser. No. 188,837, Apr. 19, 1962, now Patent No. 3,252,967, Ser. No. 188,889, Apr. 19, 1962, now Patent No. 3,252,965, Ser. No. 250,787, Ser. No. 250,788, Ser. No. 250,789, all Jan. 11, 1963, and Ser. No. 296,362, July 19, 1963. This application Dec. 10, 1969, Ser. No. 884,042
Claims priority, application Switzerland, Apr. 21, 1961, 4,709/61; Jan. 12, 1962, 359/62; Apr. 24, 1962, 4,898/62; Mar. 14, 1963, 3,225/63; May 3, 1963, 5,588/63; Feb. 25, 1964, 2,264/64
Int. Cl. C07d 29/28
U.S. Cl. 260—294.7          6 Claims

ABSTRACT OF THE DISCLOSURE

This invention relates to basic dyes of the anthraquinone series having the formula

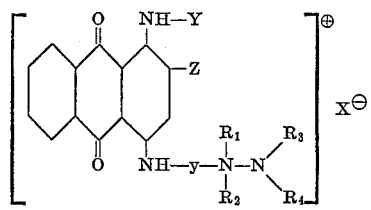

wherein Y, Z, y, $R_1$, $R_2$, $R_3$, $R_4$ and X are defined herein.

---

The present application is a division of application Ser. No. 545,776, filed Apr. 27, 1966, and now U.S. 3,515,733, which application is a continuation-in-part of our co-pending application Ser. No. 188,837, filed on Apr. 19, 1962 and now U.S. Pat. 3,252,967; Ser. No. 188,889, filed on Apr. 19, 1962 and now U.S. Pat. 3,252,965; Ser. No. 250,787, filed Jan. 11, 1963 now abandoned; Ser. No. 250,788, filed Jan. 11, 1963 now abandoned; Ser. No. 250,789, filed Jan. 11, 1963 now abandoned; and Ser. No. 296,362, filed July 19, 1963 now abandoned, and relates to new basic anthraquinone dyes and their production.

This invention relates to basic dyes of the anthraquinone series and a process for their production corresponding to the formula

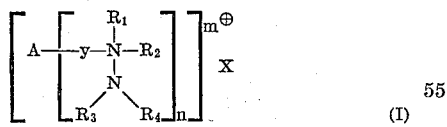

wherein
A represents the radical of a dye of the anthraquinone series free from carboxylic and sulfonic acid groups,
y a substituted or unsubstituted methylene group or an organic divalent radical bound to the adjacent N trough such as methylene group,
$R_1$ a substituted or unsubstituted alkyl, cycloalkyl or aralkyl radical or together with $R_2$ and the adjacent N atom, a heterocyclic ring system or, together with the bridge member y and the adjacent N atom, a heterocyclic ring system,
$R_2$ a substituted or unsubstituted alkyl radical or a substituted or unsubstituted cycloalkyl or aralkyl radical or, together with $R_1$ and the adjacent N atom, a heterocyclic ring system, $R_3$ hydrogen or a substituted or unsubstituted alkyl or phenyl radical,
$R_4$ hydrogen or a substituted or unsubstituted alkyl radical
n the integer 1 or 2,
m the integer 1 or 2, when n is 1, or 2 when n is 2 and
X an anion equivalent to a dye cation.

The process of the invention is characterized by replacing n substituents Z in a compound of the formula $$A\text{---}(y\text{---}Z)_n \qquad (II)$$

by or into, n groups of the formula

 (III)

wherein
A has the meaning cited above and
Z represents a substituent which can be replaced by, or converted into, a group of Formula III.

A preferred mode of operation of the present process for the production of new basic dyes of the anthraquinone series consists in reacting 1 mol of a compound of the formula $$A\text{---}(y\text{---}E)_n \qquad (IV)$$

wherein
E represents the acid radical of an ester, with n mols of a compound of the formula

 (V)

Another mode of operation of the process consists in reacting 1 mol of a compound of the formula $$A\text{---}(y\text{---}E)_n \qquad (IV)$$

with n mols of a compound of the formula $$R_1\text{---}NH\text{---}HN\text{---}R_3 \qquad (VI)$$

and quaternizing the reaction product.

A third route leading to the new basic dyes of the anthraquinone series of Formula I is as follows: 1 mol of a compound of formula

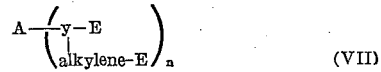 (VII)

wherein alkylene may be branched or unbranched and contains 1 to 3 carbon atoms, is reacted with 1 mol of a compound of the formula $$R_2\text{---}NH\text{---}NH\text{---}R_3 \qquad (VIII)$$

A further preferred mode of operation of the process for the production of the new basic dyes of the anthraquinone series is characterized by reacting 1 mol of an amine of the formula

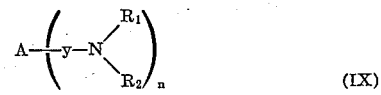 (IX)

with n mols of a halogen amine; or by reacting 1 mol of a compound of the formula

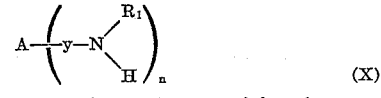 (X)

with n mols of a halogen amine and quaternizing the reaction product; or by reacting 1 mol of a compound of the formula $$A \text{-} (y\text{---}NH_2)_n \qquad (XI)$$

with n mols of a halogen amine and quaternizing the reaction product.

Alkylating agents which are suitable for converting the reaction products of the compounds of Formulae X or XI and halogen amine, or of a compound of Formula IV and a compound of Formula VI into the dye salts obtainable by the present process are e.g. the esters of strong mineral acids and organic sulfonic acids, alkyl chlorides, alkyl bromides and alkyl iodides, aralkyl halides, α-halogenated esters of low molecular fatty acids, dialkyl sulfates, alkyl esters of low molecular alkanesulfonic acids, e.g. methane-, ethane- or butanesulfonic acids, the esters of benzene-sulfonic acids which may be further substituted, such as methyl, ethyl, propyl and n-butyl esters of benzenesulfonic, 2- or 4-methylbenzenesulfonic acid, 4-chlorobenzenesulfonic acid or 3- or 4-nitrobenzenesulfonic acid, methyl chloride, methylbromide and methyl iodide or dimethylsulfate, methyl esters of low molecular alkanesulfonic acid or of benzenesulfonic acids.

Alkylation or quaternization is carried out preferably in an inert solvent, or in aqueous suspension, or without solvent in an excess of the alkylating agent and at increased temperatures with the addition of a buffering agent if necessary.

The anion or anions X may be organic or inorganic ions, e.g. the ions of methyl sulfate, sulfate, disulfate, perchlorate, chloride, bromide, iodide, phosphorus molybdate, phosphorus tungsten molybdate, benzene sulfonate, 4-chlorobenzene sulfonate, oxalate or maleinate.

Highly suitable as bridge member y are a substituted or unsubstituted methylene group or a divalent or trivalent radical bound to the adjacent N through this group, e.g. —(CH$_2$)$_p$— where p is the number 1 to 6,

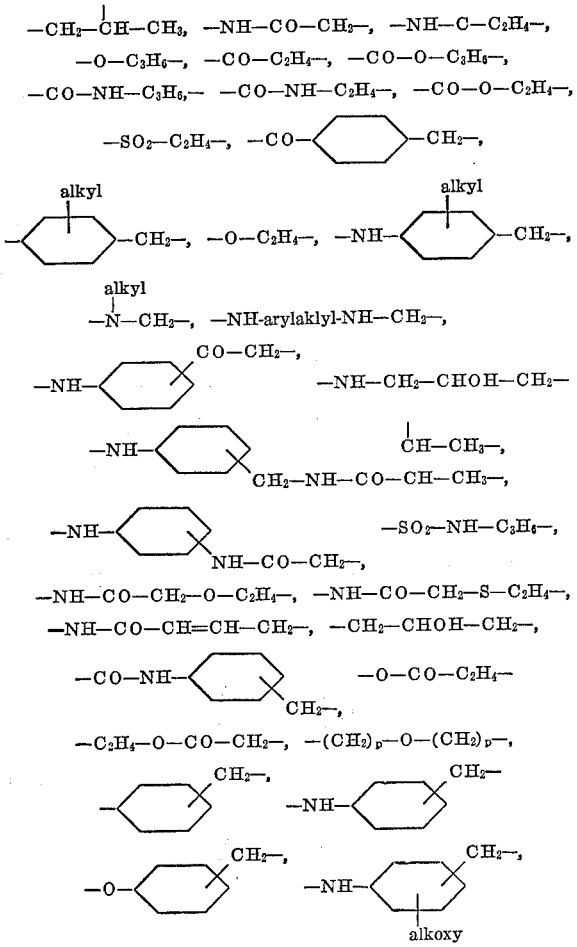

etc.

Together with R$_1$ and the adjacent N atom, y can form a heterocyclic ring system which gives rise to ring groupings such as:

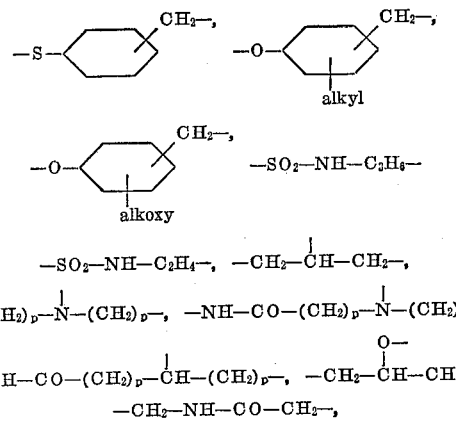

These compounnds can be obtained, for example, by reacting a compound of Formulae VII, e.g. dihalogen compounds, with a compound of Formula VIII, e.g.

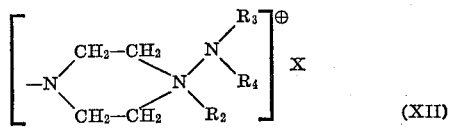

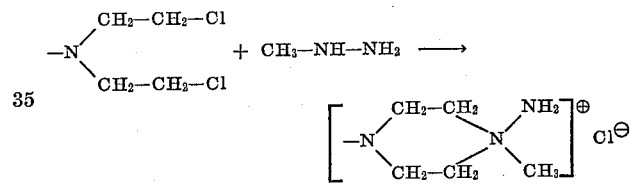

etc.

Ring groupings of this type can be combined to A through a member V; they then correspond to a grouping of the formula

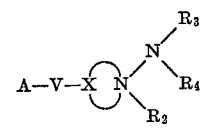

wherein X represents N or CH and the ring may contain other hetero atoms when X stands for CH, and V may represent a part of bridge member y.

The symbols R$_1$, R$_2$, R$_3$, R$_4$, y, n, m and X may have the same meanings in the anthraquinone pyridine and pyridone series.

R$_1$ and R$_2$ together with the adjacent N can form a heterocyclic ring system without y, e.g. a pyrrolidine, a piperidine, piperazine, a morpholine, a 1,2,4-triazol or an ethylene imine grouping etc.

Examples of suitable acid radicals E are those of sulfuric acid (E=SO$_4$H), a sulfonic acid (E=SO$_3$R where R is a substituted or unsubstituted hydrocarbon radical), and hydrogen sulfide (E=SH), but preferably the radicals of the halogen hydracids (E=Cl, Br etc.) are employed.

The reaction of a compound of Formula IV with a hydrazine of the Formula V or VI, or a compound of Formula VII with a hydrazine of Formula VIII is effected preferably in an organic solvent and at temperatures of —50° C. to +250° C. The reaction can also be carried out in aqueous medium, if necessary with the addition of an organic solvent, or without solvent at the above-stated temperatures.

The reaction of an amine of Formulae IX, X or XI with a halogenamine as carried out preferably in an organic solvent and at temperatures of —50° C. to +80° C. The reaction can also be effected in aqueous medium, if necessary with the addition of an organic solvent, at the above-stated temperatures.

The halogenamine can be employed either in gaseous form or in solution in an organic solvent, in water, or in a solvent-water mixture.

The dyes formed are separated by one of the basic operations such as filtration, evaporation and filtration, precipitation from a suitable medium and filtration.

The new dyes are excellent for dyeing, padding and printing materials of polymers containing more than 80% acrylonitrile, e.g. polyacrylonitrile, e.g. Orlon (registered trademark), and copolymers containing 80–90% acrylonitrile and 20–10% vinyl acetate, methyl acrylate or methyl methacrylate.

These products are marketed under the following names, most of which are registered trademarks: Acrilan (the copolymer of 85% acrylonitrile and 15% vinyl acetate or vinyl pyridine), Orlon, Dralon, Courtelle, Crylor, Dynel, etc.

The dyeings on these materials obtained with the dyes of the process possess good fastness to light, washing, perspiration, sublimation, pleating, decatizing, pressing, water, sea water, bleaching, dry cleaning, cross dyeing, and solvents. The dyes have very good solubility in water.

The dyes of the present process are dyed to best advantage from aqueous medium, and it is preferable for the medium to be neutral or acid and of boiling temperature.

The commercially available retarding agents can be used in dyeing without adverse effect, though the new dyes produce perfectly level dyeings on the above-named polymers and copolymers without the addition of these agents. The dyes can be applied in closed equipment and under pressure, as they are highly stable to prolonged boiling. They also give very good dyeings on blend fabrics containing a polyacrylonitrile fiber or acrylonitrile copolymer fiber as one of the components. A selected number of the new dyes are suitable for dyeing polyacrylonitrile in the mass in shades fast to light and wet treatments. The dyes of the present process which possess good solubility in organic solvents are suitable for the coloration of oils, paint and lacquer media, and plastics, and for the dyeing of fiber-forming materials in the spinning solution. They have many other uses, for example, the dyeing of tannin-treated cotton, wool, silk, regenerated cellulose, synthetic polyamide fibers, and paper, at all stages of manufactures. It has been found that mixtures of two or more dyes of Formula I can be used with good success.

The new dyes are well suited for combination, so that dye salts of the same or different dye classes can be used for producing widely different shades.

In the following examples the parts and percentages are by weight and the temperatures in degrees centigrade.

EXAMPLE 1

4.46 parts of 1,4-di-(2′,6′-dimethyl)-phenylaminoanthraquinone are added to 45 parts of sulfuric acid monohydrate at 10–15° and the mixture stirred until everything has dissolved. 3 parts of dichlorodimethyl ether are added in the temperature range of 10–15°. On completion of reaction, the reaction product is discharged onto 400 parts of ice, the precipitated compound filtered off and subsequently rinsed in cold water.

5.43 parts of 1,4-di-(2′,6′-dimethyl-3′-dichloromethyl)-phenylaminoanthraquinone are added to a mixture of tertiary butyl alcohol and ethanol at 20–30°. The mixture is heated to 80° and at this temperature 1 part of asymmetric dimethyl hydrazine, dissolved in 10 parts of ethanol, is added dropwise in the course of 1 hour. On completion of reaction the solvent is distilled off with vacuum, and the dry residue recrystallized from water/ethanol. A good yield is obtained of the blue dye of the formula

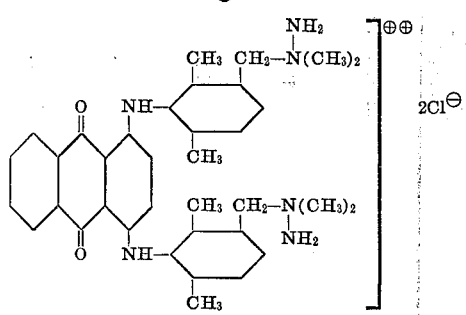

Further valuable dyes of the anthraquinone series which can be produced in accordance with the particulars of Example 1, 136 and 137 are set out in Table 1 below. They correspond to the formula $$\left[\begin{array}{c} R_8\ O\ R_1 \\ R_7\text{---}\!\!\!\!\phantom{X}\!\!\!\!\text{---}R_2 \\ R_6\text{---}\!\!\!\!\phantom{X}\!\!\!\!\text{---}R_3 \\ R_5\ O\ R_4 \end{array}\right]^{n\oplus} nX^{\ominus} \qquad (XII)$$

where the symbols $R_1$, $R_2$, $R_3$, $R_4$, $R_5$, $R_6$, $R_7$ and $R_8$ have the meanings assigned them in the said table.

The anion $X^{\ominus}$ may be any one of those named in the specification. In the following Tables 1, 2, 3 and 4 the symbols $K_1$, $K_2$, $K_3$, $K_4$, $K_5$, $K_6$ and $K_7$ represent the following groupings:

$K_1$ = the grouping:

$$\left[\begin{array}{c} NH_2 \\ | \\ -N(CH_3)_2 \end{array}\right]^{\oplus} X^{\ominus}$$

$K_2$ = the grouping:

$$\left[\begin{array}{c} NH_2 \\ | \\ -N(C_2H_5)_2 \end{array}\right]^{\oplus} X^{\ominus}$$

$K_3$ = the grouping:

$$\left[\begin{array}{c} NH_2 \\ | \\ -N(C_2H_4OH)_2 \end{array}\right]^{\oplus} X^{\ominus}$$

$K_4$ = the grouping:

$$\left[\begin{array}{c} \phantom{-}CH_2\text{--}CH_2 \\ -N\diagdown\phantom{XX}\diagup \\ |\phantom{XX}CH_2\text{--}CH_2 \\ NH_2 \end{array}\right]^{\oplus} X^{\ominus}$$

$K_5$ = the grouping:

$$\left[\begin{array}{c} \phantom{-}CH_2\text{--}CH_2\diagdown \\ -N\diagdown\phantom{XXXX}CH_2 \\ |\phantom{XX}CH_2\text{--}CH_2\diagup \\ NH_2 \end{array}\right]^{\oplus} X^{\ominus}$$

$K_6$ = the grouping:

$$\left[\begin{array}{c} \phantom{-}CH_2\text{--}CH_2\diagdown \\ -N\diagdown\phantom{XXXX}O \\ |\phantom{XX}CH_2\text{--}CH_2\diagup \\ NH_2 \end{array}\right]^{\oplus} X^{\ominus}$$

$K_7$ = the grouping:

$$\left[\begin{array}{c} \phantom{-}CH=N\diagdown \\ -N\diagdown\phantom{XXX}| \\ |\phantom{XX}CH=N\diagup \\ NH_2 \end{array}\right]^{\oplus} X^{\ominus}$$

The symbols $K_1$, $K_2$, $K_3$, $K_4$, $K_5$, $K_6$ and $K_7$ in the individually presented dyestuffs are chosen from the series displayed above. These groupings can be exchanged in any of the dyes for another grouping in the series. Thus, the symbols $K_2$, $K_3$, $K_4$, $K_5$, $K_6$, $K_7$ or $K_8$ may appear in place of $K_1$. It may therefore be noted as fundamental that in these dyes the symbol K with a given number may in each instance be exchanged for any other symbol K having a number different from it.

| Ex. No. | $R_8$ | $R_7$ | $R_6$ | $R_5$ | $R_1$ | $R_2$ | $R_3$ | $R_4$ | Shade of the dyeing on polyacrylonitrile (I) |
|---|---|---|---|---|---|---|---|---|---|
| 2 | H | H | H | H | $NH_2$ | —O—⟨⟩—$CH_2$—$K_2$ | H | OH | Bluish-red. |
| 3 | H | H | H | H | $NH_2$ | —O—⟨⟩—$CH_2$—$K_3$ | H | OH | Do. |
| 4 | H | H | H | H | $NH_2$ | —O—⟨⟩—$CH_2$—$K_4$ | H | OH | Do. |
| 5 | H | H | H | H | $NH_2$ | —O—⟨⟩—$CH_2$—$K_5$ | H | OH | Do. |
| 6 | H | H | H | H | $NH_2$ | —O—⟨⟩—$CH_2$—$K_6$ | H | OH | Do. |
| 7 | H | H | H | H | $NH_2$ | —O—⟨⟩—$CH_2$—$K_7$ | H | OH | Do. |
| 8 | H | H | H | H | $NH_2$ | —O—⟨⟩—$CH_2$—$K_1$ | H | $NH_2$ | Red. |
| 9 | H | H | H | H | OH | —O—⟨⟩—$CH_2$—$K_5$ | H | $NH—CH_3$ | Violet. |
| 10 | H | H | H | H | OH | —O—⟨⟩—$CH_2$—$K_3$ | H | $NH$—⟨⟩ | Blue-violet. |
| 11 | H | H | H | H | OH | —O—⟨⟩—$CH_2$—$K_4$ | H | $NH_2$ | Red-violet. |
| 12 | H | H | H | H | $NH_2$ | —O—⟨⟩—$CH_2$—$K_1$ | H | $NH$—⟨⟩ | Violet. |
| 13 | H | H | H | H | $NH_2$ | —O—⟨⟩—$CH_2$—$NH$—$CO$—$CH_2$—$K_4$ | H | OH | Red. |

| Ex. No. | $R_8$ | $R_7$ | $R_6$ | $R_5$ | $R_1$ | $R_2$ | $R_3$ | $R_4$ | Shade of the dyeing on polyacrylonitrile (I) |
|---|---|---|---|---|---|---|---|---|---|
| 15 | H | H | H | H | $NH_2$ | $-O-\langle\text{phenyl}\rangle-CH_2-NH-CO-CH_2-K_2$ | H | $NH_2$ | Violet. |
| 16 | H | H | H | H | $NH_2$ | $-O-\langle\text{phenyl}\rangle-CH_2-NH-CO-CH_2-K_1$ | H | $NH-\langle\text{phenyl}\rangle$ | Blue-violet. |
| 17 | H | H | H | H | $NH_2$ | $-O-\langle\text{phenyl}\rangle-CH_2-NH-CO-CH(CH_3)-K_7$ | H | $OH$ | Red. |
| 18 | H | H | H | H | $NH_2$ | $-O-\langle\text{phenyl}\rangle-CH_2-NH-CO-CH(CH_3)-K_8$ | H | $NH_2$ | Violet. |
| 19 | H | H | H | H | $NH_2$ | $-O-\langle\text{phenyl}\rangle-CH_2-NH-CO-CH(CH_3)-K_2$ | H | $NH-\langle\text{phenyl}\rangle$ | Blue-violet. |
| 20 | H | H | H | H | $NH_2$ | $-O-\langle\text{phenyl}\rangle-CH_2-NH-CO-C(=CH_2)-K_1$ | H | $OH$ | Bluish-red. |
| 21 | H | H | H | H | $NH_2$ | Same as above | $-O-\langle\text{phenyl}\rangle-CH_2-NH-CO-C(=CH_2)-K_1$ | $NH_2$ | Violet. |
| 22 | H | H | H | H | $NH_2$ | $-O-\langle\text{phenyl}\rangle-CH_2-K_2$ | $-O-\langle\text{phenyl}\rangle-$ | $OH$ | Red. |
| 23 | H | H | H | H | $NH_2$ | $-O-\langle\text{phenyl}\rangle-CH_2-K_3$ | $-O-\langle\text{phenyl}\rangle-$ | $NH_2$ | Violet. |
| 24 | H | H | H | H | $NH_2$ | $-O-\langle\text{phenyl}\rangle-CH_2-NH-CO-CH_2-K_6$ | $-O-\langle\text{phenyl}\rangle-$ | $NH_2$ | Red-violet. |
| 25 | H | H | H | H | $NH_2$ | $-O-\langle\text{phenyl}\rangle-CH_2-NH-CO-CH_2-K_1$ | $-O-\langle\text{phenyl}\rangle-CH_2-NH-CO-CH_2-K_1$ | $NH_2$ | Violet. |
| 26 | H | H | H | H | $NH_2$ | $-O-\langle\text{phenyl}\rangle-CH_2-K_1$ | H | $NH-\langle\text{cyclohexyl with }CH_2CH_3, CH_3, CH_3, CH_3\rangle$ | Reddish-blue. |

| Ex. No. | R_8 | R_7 | R_6 | R_5 | R_1 | R_2 | R_3 | R_4 | Shade of the dyeing on polyacrylonitrile (I) |
|---|---|---|---|---|---|---|---|---|---|
| 27 | H | H | H | H | NH_2 | H | H | NH—(CH_2)_3—K_4 | Blue. |
| 28 | H | H | H | H | NH_2 | CH_3 | H | NH—(CH_2)_3—K_3 | Reddish-blue. |
| 29 | H | H | H | H | NHCH_3 | H | H | Same as above | Blue. |
| 30 | H | H | H | H | Same as above | H | H | do | Do. |
| 31 | H | H | H | H | do | H | H | NH—(CH_2)_3—K_5 | Do. |
| 32 | H | H | H | H | do | H | H | NH—(CH_2)_3—K_4 | Do. |
| 33 | H | H | H | H | do | H | H | NH—(CH_2)_3—K_5 | Do. |
| 34 | H | H | H | H | do | H | H | NH—(CH_2)_3—K_4 | Do. |
| 35 | H | H | H | H | do | H | H | NH—(CH_2)_3—K_1 | Do. |
| 36 | H | H | H | H | NH_2 | Br | H | NH—(CH_2)_3—K_1 | Do. |
| 37 | H | H | H | H | NH_2 | Cl | H | Same as above | Reddish-blue. |
| 38 | H | H | H | H | NH_2 | CH_3 | H | NH—(CH_2)_2—K_5 | Do. |
| 39 | H | H | H | H | NH_2 | H | H | NH—(CH_2)_2—K_1 | Do. |
| 40 | H | H | H | H | NH_2 | CH_3 | H | NH—(CH_2)_2—K_1 | Blue. |
| 41 | H | H | H | H | NH_2 | Br | H | NH—(CH_2)_2—K_7 | Reddish-blue. |
| 42 | H | H | H | H | NH_2 | Cl | H | NH—(CH_2)_2—K_1 | Do. |
| 43 | H | H | H | H | NH_2 | Cl | H | NH—(CH_2)_2—K_5 | Do. |
| 44 | H | H | H | H | NH_2 | Cl | H | NH—(CH_2)_2—K_3 | Reddish-blue. |
| 45 | H | H | H | H | NH_2 | Cl | H | NH—(CH_2)_2—K_4 | Blue. |
| 46 | H | H | H | H | NH_2 | Cl | H | NH—(CH_2)_2—K_5 | Do. |
| 47 | H | H | H | H | NH_2 | Cl | H | NH—(CH_2)_2—K_4 | Do. |
| 48 | H | H | H | H | NH_2 | Cl | H | NH—(CH_2)_2—K_7 | Do. |
| 49 | H | H | H | H | NH—⟨phenyl⟩ | H | H | NH—CH_2—CHOH—CH_2—K_4 | Greenish-blue. |
| 50 | H | H | H | H | NH—CH_2—CHOH—CH_2—K_4 | H | H | Same as above | Blue. |
| 51 | H | H | H | H | NH—CH_2—CHOH—CH_2Cl | H | H | NH—CHOH—CH_2—K_7 | Scarlet. |
| 52 | H | H | H | H | H | H | H | NH—CHOH—CH_2—K_5 | Red. |
| 53 | H | H | H | H | OH | H | H | NH—CHOH—CH_2—K_3 | Violet. |
| 54 | H | H | H | H | NH_2 | Br | H | NH—CHOH—CH_2—K_4 | Blue. |
| 55 | H | H | H | H | NH—C_2H_4—K_1 | H | H | NH—C_2H_4—K_1 | Do. |
| 56 | H | H | H | H | NH—C_3H_6—K_1 | H | H | NH—C_3H_6—K_1 | |
| 57 | H | H | H | H | NH_2 | H | H | NH—⟨phenyl⟩—CH_3 / CH_2—K_1 / CH_2—K_2 | Do. |
| 58 | H | H | H | H | NH_2 | H | H | NH—⟨phenyl⟩—CH_3 / CH_2K_4 | Do. |
| 59 | H | H | H | H | NH_2 | H | H | NH—⟨phenyl⟩—CH_3 / CH_2—K_3 | Do. |
| 60 | H | H | H | H | NH—CH_3 | H | H | NH—⟨phenyl⟩—CH_3 / CH_2—K_4 | Do. |
| 61 | H | H | H | H | Same as above | H | H | NH—⟨phenyl⟩—CH_3 / CH_2—K_4 | Do. |

| Ex. No. | $R_8$ | $R_7$ | $R_6$ | $R_5$ | $R_1$ | $R_2$ | $R_3$ | $R_4$ | Shade of the dyeing on polyacrylonitrile (I) |
|---|---|---|---|---|---|---|---|---|---|
| 62 | H | H | H | H | NH—CH$_3$ | H | H | NH—⟨C$_6$H$_4$⟩—C(CH$_3$)(CH$_2$—K$_5$)(CH$_2$—K$_6$) | Blue. |
| 63 | H | H | H | H | Same as above | H | H | NH—⟨C$_6$H$_4$⟩—C(CH$_3$)(CH$_2$—K$_6$)(CH$_2$—K$_7$) | Do. |
| 64 | H | H | H | H | do. | H | H | NH—⟨C$_6$H$_4$⟩—C(CH$_3$)(CH$_2$—K$_7$)(CH$_2$—K$_8$) | Do. |
| 65 | H | H | H | H | do. | H | H | NH—⟨C$_6$H$_4$⟩—C(CH$_3$)(CH$_2$—K$_1$)(CH$_2$—K$_8$) | Do. |
| 66 | H | H | H | H | do. | H | H | NH—⟨C$_6$H$_4$⟩—C(CH$_3$)(CH$_2$—K$_1$)(CH$_2$—K$_2$) | Do. |
| 67 | H | H | H | H | NH—⟨C$_6$H$_{11}$⟩ | H | H | NH—⟨C$_6$H$_4$⟩—C(CH$_3$)(CH$_2$—K$_2$)(CH$_2$—K$_4$) | Green. |
| 68 | H | H | H | H | NH—C$_2$H$_4$OH | H | H | NH—⟨C$_6$H$_4$⟩—C(CH$_3$)(CH$_2$—K$_2$)(CH$_2$—K$_3$) | Blue. |
| 69 | H | H | H | H | NH$_2$ | H | H | NH—⟨C$_6$H$_4$⟩—C(CH$_2$—K$_1$)(CH$_3$) | Do. |
| 70 | H | H | H | H | NH$_2$ | H | H | NH—⟨C$_6$H$_4$⟩—C(CH$_2$—K$_2$)(CH$_3$) | Do. |
| 71 | H | H | H | H | NH$_2$ | H | H | NH—⟨C$_6$H$_4$⟩—C(CH$_2$—K$_3$)(CH$_3$) | Do. |
| 72 | H | H | H | H | NH$_2$ | H | H | NH—⟨C$_6$H$_4$⟩—C(CH$_2$—K$_4$)(CH$_3$) | Do. |
| 73 | H | H | H | H | NH$_2$ | H | H | NH—⟨C$_6$H$_4$⟩—C(CH$_2$—K$_5$)(CH$_3$) | Do. |

| Ex. No. | $R_8$ | $R_7$ | $R_6$ | $R_5$ | $R_1$ | $R_2$ | $R_3$ | $R_4$ | Shade of the dyeing on polyacrylonitrile (I) |
|---|---|---|---|---|---|---|---|---|---|
| 74 | H | H | H | H | $NH_2$ | H | H | $NH-\underset{}{\bigcirc}-CH_2-K_6$ | Blue. |
| 75 | H | H | H | H | $NH_2$ | H | H | $NH-\underset{}{\bigcirc}-CH_2-K_7$ | Do. |
| 76 | H | H | H | H | $NH-CH_3$ | H | H | $NH-\underset{}{\bigcirc}-CH_2-K_1$ | Do. |
| 77 | H | H | H | H | $NH-\bigcirc$ | H | H | $NH-\underset{}{\bigcirc}-CH_2-K_2$ | Green. |
| 78 | H | H | H | H | $NH-C_2H_4OH$ | H | H | Same as above | Blue. |
| 79 | H | H | H | H | $NH_2$ | Cl | H | $NH-\underset{CH_2-K_4}{\bigcirc}-CH_3$ | Reddish-blue. |
| 80 | H | H | H | H | $NH_2$ | H | H | $NH-\underset{CH_2-K_1}{\bigcirc}-OCH_3$ | Do. |
| 81 | H | H | H | H | $NH-CH_3$ | H | H | Same as above | Blue. |
| 82 | H | H | H | H | $NH_2$ | $CH_3$ | H | $NH-\underset{OCH_3}{\bigcirc}-CH_2-K_2$ | Do. |
| 83 | H | H | H | H | $NH-\bigcirc$ | H | H | $NH-\underset{CH_3}{\bigcirc}-CH_2-K_1$ | Do. |
| 84 | H | H | H | H | $NH-\bigcirc$ | H | H | $NH-\underset{CH_3}{\bigcirc}-CH_2-K_1$ | Green. |
| 85 | H | H | H | H | OH | H | H | $NH-\underset{CH_3}{\bigcirc}-CH_2-K_7$ | Reddish-blue. |
| 86 | H | Cl | Cl | H | $NH-\underset{CH_3}{\underset{|}{\overset{CH_2-K_4}{\bigcirc}}}$ | H | H | $NH-\underset{CH_3}{\bigcirc}-CH_2-K_1$ | Green. |

| Ex. No. | $R_8$ | $R_7$ | $R_6$ | $R_5$ | $R_1$ | $R_2$ | $R_3$ | $R_4$ | Shade of the dyeing on polyacrylonitrile (I) |
|---|---|---|---|---|---|---|---|---|---|
| 87 | H | H | H | OH | NH—⟨C₆H₃(CH₂-K₄)(CH₃)⟩ | H | H | NH—⟨C₆H₃(CH₂-K₄)(CH₃)⟩ | Green. |
| 88 | OH | H | H | OH | NH—⟨C₆H₃(CH₂-K₄)(CH₃)⟩ | H | H | NH—⟨C₆H₃(CH₂-K₅)(CH₃)⟩ | Do. |
| 89 | H | H | H | H | $NH_2$ | —O—$C_2H_4$—$K_5$ | H | NH—⟨C₆H₄(CH₃)⟩ | Blue. |
| 90 | H | H | H | H | $NH_2$ | Cl | H | NH—⟨C₆H₃⟩—$NH-CH_2-CHOH-CH_2-K_3$ | Do. |
| 91 | H | H | H | H | $NH-CH_3$ | H | H | NH—⟨C₆H₃⟩—$NH-CH_2-CHOH-CH_2-K_4$ | Do. |
| 92 | H | H | H | H | NH—⟨C₆H₅⟩ | H | H | NH—⟨C₆H₃⟩—$NH-CH_2-CHOH-CH_2-K_3$ | Green. |
| 93 | H | H | H | H | $NH_2$ | H | H | NH—⟨C₆H₃(CH₃)(CH₃)⟩—$CH_2-NH-CO-CH_2-K_1$ | Reddish-blue. |
| 94 | H | H | H | H | $NH_2$ | $CH_3$ | H | NH—⟨C₆H₃(CH₃)⟩—$CH_3 CH_2-NH-CO-CH_2-K_1$ | Do. |
| 95 | H | H | H | H | $NH_2$ | H | H | NH—⟨C₆H₃(CH_3)⟩—$CH_2-NH-CO-CH_2-K_5$ | Blue. |
| 96 | H | H | H | H | $NH_2$ | H | H | NH—⟨C₆H₃(CH_3)⟩—$CH_2-NH-CO-C_2H_4-K_7$ | Do. |
| 97 | H | H | H | H | $NH_2$ | $CH_3$ | H | NH—⟨C₆H₃(OCH_3)⟩—$OCH_3 CH_2-NH-CO-CH_2-K_3$ | Do. |
| 98 | H | H | H | H | $NH_2$ | H | H | NH—⟨C₆H₃(OCH_3)⟩—$CH_2-NH-CO-CH_2-K_3$ | Do. |

| Ex. No. | R8 | R7 | R6 | R5 | R1 | R2 | R3 | R4 | Shade of the dyeing on polyacrylo-nitrile (I) |
|---|---|---|---|---|---|---|---|---|---|
| 99 | H | H | H | H | NH—CH₃ | H | H | NH—C₆H₃(OCH₃)(CH₂—NH—CO—CH₂—K₁) | Blue. |
| 100 | H | H | H | H | NH₂ | CH₃ | H | NH—C₆H₃(OCH₃)(CH₂—NH—CO—CH₂—K₁) | Do. |
| 101 | H | H | H | H | NH—C₆H₅ | H | H | NH—C₆H₃(OCH₃)(CH₂—NH—CO—CH₂—K₁) | Green. |
| 102 | H | H | H | H | NH₂ | H | H | NH—C₆H₂(CH₃)₂(CH₂—NH—CO—CH₂—K₁) | Blue. |
| 103 | H | H | H | H | OH | H | H | NH—C₆H₂(CH₃)₂(CH₂—NH—CO—C(CH₃)=CH₂—K₄) | Red-violet. |
| 104 | H | H | H | H | OH | H | H | NH—C₆H₄—NH—CO—C₂H₄—K₁ | Violet. |
| 105 | H | H | H | H | NH₂ | H | H | NH—C₆H₄—NH—CO—C₃H₆—K₁ | Blue. |
| 106 | H | H | H | H | NH—CH₃ | H | H | NH—C₆H₄—NH—CO—CH₂—K₁ | Do. |
| 107 | H | H | H | H | NH₂ | H | H | NH—C₆H₄—NH—CO—CH₂—K₄ | Do. |
| 108 | H | H | H | H | NH₂ | CH₃ | H | NH—C₆H₄—NH—CO—CH₂—K₁ | Do. |
| 109 | H | H | H | H | NH—C₆H₅ | H | H | NH—C₆H₄—NH—CO—CH₂—K₇ | Green. |
| 110 | H | H | H | H | NH—C₂H₄OH | H | H | NH—C₆H₄—NH—CO—CH₂—K₁ | Blue. |
| 111 | H | H | H | H | OH | H | H | NH—C₆H₄—NH—CO—CH₂—K₁ | Violet. |

| Ex. No. | $R_8$ | $R_7$ | $R_6$ | $R_5$ | $R_1$ | $R_2$ | $R_3$ | $R_4$ | Shade of the dyeing on polyacrylonitrile (I) |
|---|---|---|---|---|---|---|---|---|---|
| 112 | H | H | H | H | OH | H | H | NH—⬡—NH—CO—C$_2$H$_4$—K$_4$ | Violet. |
| 113 | H | H | H | H | OH | H | H | NH—⬡—NH—CO—C$_3$H$_6$—K$_1$ | Do. |
| 114 | H | H | H | H | OH | H | H | NH—⬡—NH—CO—CH$_2$—K$_1$ | Do. |
| 115 | H | H | H | H | NH$_2$ | H | H | Same as above | Blue. |
| 116 | H | H | H | H | NH—CH$_3$ | H | H | do | Do. |
| 117 | H | H | H | H | NH$_2$ | CH$_3$ | H | NH—⬡—NH—CO—CH$_2$—K$_4$ | Do. |
| 118 | H | H | H | H | NH—⬡ | H | H | Same as above | Green. |
| 119 | H | H | H | H | NH$_2$ | H | H | NH—⬡—CO—NH—C$_2$H$_4$—K$_2$ | Blue. |
| 120 | H | H | H | H | NH$_2$ | H | H | NH—⬡—CO—NH—C$_3$H$_6$—K$_1$ | Do. |
| 121 | H | H | H | H | NH$_2$ | H | H | NH—⬡—CO—NH—C$_2$H$_4$—K$_4$ | Do. |
| 122 | H | H | H | H | NH—CH$_3$ | H | H | NH—⬡—CO—NH—C$_2$H$_4$—K$_2$ | Do. |
| 123 | H | H | H | H | NH$_2$ | CH$_3$ | H | NH—⬡—CO—NH—C$_2$H$_4$—K$_1$ | Do. |
| 124 | H | H | H | H | NH$_2$ | Br | H | NH—⬡—CO—NH—C$_2$H$_4$—K$_3$ | Violet. |
| 125 | H | H | H | H | NH—CH$_3$ | H | H | NH—⬡—CO—NH—C$_2$H$_4$—K$_1$ | Do. |

| Ex. No. | $R_8$ | $R_7$ | $R_6$ | $R_5$ | $R_1$ | $R_2$ | $R_3$ | $R_4$ | Shade of the dyeing on polyacrylonitrile (1) |
|---|---|---|---|---|---|---|---|---|---|
| 126 | H | H | H | H | $NH_2$ | H | H | phenyl-NH— with $SO_2$–NH–$C_2H_4$–$K_5$ and $CH_3$ | Blue. |
| 127 | H | H | H | H | $NH_2$ | $CH_3$ | H | phenyl-NH— with $SO_2$–NH–$C_2H_4$–$K_1$ | Do. |
| 128 | H | H | H | H | NH–$CH_3$ | H | H | phenyl-NH— with $SO_2$–NH–$C_2H_4$–$K_1$ and –$OCH_3$ | Do. |
| 129 | H | H | H | H | OH | H | H | phenyl-NH— with $CH_3$, $CH_3$, and $SO_2$–NH–$C_2H_4$–$K_4$ | Reddish-blue. |
| 130 | H | H | H | H | $NH_2$ | phenyl–O– with $CH_2$–$K_1$ and $CH_3$ | H | OH | Do. |
| 131 | H | H | H | H | $NH_2$ | phenyl–O– with $CH_2$–$K_3$ and $OCH_3$ | H | OH | Bluish-red. |
| 132 | H | H | H | H | OH | H | H | phenyl-NH— with $CH_3$, $CH_3$ $CH_2$–$K_5$ | Violet. |
| 133 | H | H | H | H | $NH_2$ | $CH_3$ | H | phenyl-NH— with $CH_3$, $CH_3$ $CH_2$–$K_1$ | Do. |
| 134 | H | H | H | H | NH–$CH_3$ | H | H | phenyl-NH— with $CH_3$, $CH_3$ $CH_2$–$K_1$ | Blue. |
| 135 | H | H | H | H | $NH_2$ | $CH_3$ | H | phenyl-NH— with $CH_3$, $CH_3$ and $CH_2$–NH–CO–$CH_2$–$K_1$ | Do. |

EXAMPLE 136

The dye of Example 137 can be obtained by the following alternative procedure. 68.4 parts of 1-methylamino-4-p-methylphenyl-aminoanthraquinone are stirred into a solution of 728 parts of 100% sulfuric acid and 12 parts of water at 20–30°. In the course of 2–8 hours 92 parts of dichloro-dimethylether are added at 20–32°. The mass is then stirred for 20–40 hours at 20–32° and when the reaction has run its course it is discharged into a mixture of 800 parts of water and 800 parts of ice. The precipitated dye is filtered off, washed with cold water until of neutral reaction, and dried at 40–60° in a vacuum drying cabinet.

78 parts of the dried chloromethylated dye are added to 156 parts of 1,1-dimethylhydrazine in 1–2 hours with stirring. The reaction commences instantaneously and the temperature of the mass increases to 30–32°. When the addition is complete, the mass is stirred for a further 2 hours and subsequently the excess 1,1-dimethyl-hydrazine is distilled off. The dry dye remaining can be purified by reprecipitation from water. The dye has the same melting point as that of Example 137. It dyes polyacrylonitrile fibers in level, bright blue shades which have excellent light and washing fastness.

Dyeing Example A 20 parts of the dye obtained according to Example 12 are intimately mixed with 80 parts of dextrin in a ball mill for 48 hours. 1 part of this preparation is pasted with 1 part of acetic acid 40%, 400 parts of distilled water at 60° are poured over the paste with constant agitation and the whole boiled for a short time. The solution is diluted with 7600 parts of distilled water, and 2 parts of glacial acetic acid are added. 100 parts of Orlon (registered trademark) are entered in this bath at 60°. The material is pretreated for 10–15 minutes at 60° in a bath of 8000 parts of water and 2 parts of glacial acetic acid. The dyebath is brought to 100° in 30 minutes, boiled for 1 hour and the material rinsed. A level redviolet dyeing of excellent light fastness and very good wet fastness is obtained.

Pad dyeing Example B

A padding liquor is prepared with:

50 parts per liter of dye (corresponding to the dyeing preparation produced in the previous dyeing example)
3 parts per liter of sodium alginate
5 parts per liter of acetic acid conc.
20 parts per liter of a cationic softener, e.g. a condensation product of 1 mol stearic acid and 1 mol, triethanolamine
25 parts per liter of Glauber's salt Polyacrylonitrile fiber material is padded cold by the usual method on a 2 or 3 bowl pad. The pick-up is 80%. After intermediate drying for a short time at 90° on tenters, in a hot flue or by infrared radiation, the material is fixed for 1–3 minutes with dry air at 170–190° on tenters, subsequently rinsed, soaped and rinsed again. A red-violet dyeing with excellent light fastness is obtained.

Textile printing example

A printing paste is made up with:

75 parts of dye (corresponding to the dyeing preparation produced in the previous dyeing example)
10 parts of acetic acid conc.
450 parts of sodium alginate thickening
25 parts of a cationic softener, e.g. a condensation product of 1 mol stearic acid and 1 mol triethanolamine
25 parts Glauber's salt
415 parts of water 1000 parts Polyacrylonitrile fiber material is printed according to the usual hand-block printing process, and subsequently air-dried, steamed for 20–30 minutes in a star steamer with saturated steam, rinsed, soaped, rinsed again and dried. On polyacrylonitrile fabrics a red-violet print with very good fastness properties is obtained.

Dyeing Example C 20 parts of the dye obtained according to Example 136 are intimately ground with 80 parts of dextrin in a ball mill for 48 hours.

1 part of this preparation is then pasted with 1 part of acetic acid 40%, 400 parts of distilled water at 60° poured over the paste with constant agitation and the whole boiled. The solution is diluted with 7600 parts of distilled water and 2 parts of glacial acetic acid are added. 100 parts of Orlon (registered trademark) are entered in this bath at 60°. The material is pretreated for 10–15 minutes at 60° in a bath of 8000 parts of water and 2 parts of glacial acetic acid. The dyebath is brought to 100° in 30 minutes, boiled for 1 hour and the material rinsed and dried.

Dyeing Example D

The dye obtained according to Example 136, after grinding, with dextrin or Glauber's salt or with another inorganic or organic diluent, can be applied as given in Dyeing Example C. In place of 2 parts of glacial acetic acid either a mixture of 5 parts of Glauber's salt, 3 parts of sodium acetate and 2 parts of glacial acetic acid, or 2 parts of concentrated sulfuric acid can be added to the dyebath.

EXAMPLE 137

9.8 parts of the monochloromethylated reaction product of 1-methylamino-4-toluidinoanthraquinone obtained by reaction with dichlorodimethyl ether are added to 90 parts of methanol, the mixture subsequently brought to the boil and a solution of 1,7 parts of 1,1-demethylhydrazine in 10 parts of methanol dropped in at this temperature. The temperature is maintained at 65–70° for 24 hours and the mixture then left to cool.

The precipitate formed is filtered off, washed with methanol and dried. It dissolves in concentrated sulfuric acid with a green-blue, and in water with a blue coloration, melts at 228–234° and has the formula

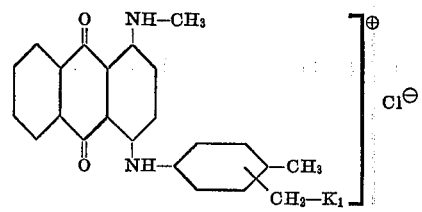

Polyacrylonitrile fibers are dyed in brilliant blue shades by this dye.

Further dyestuffs are enumerated in the following Table 2.

The symbols $R_1$, $R_2$, $R_3$, $R_4$, $R_5$, $R_8$ in the general Formula XII

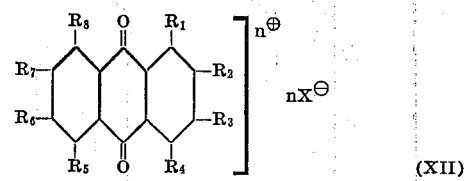

(XII)

have the meanings given them in the Table 2.

TABLE 2

| Example No. | $R_1$ | $R_2$ | $R_3$ | $R_4$ | $R_5$ | $R_6$ | $n$ | $X$ | Shade of the dyeing on polyacrylonitrile fibers (I) |
|---|---|---|---|---|---|---|---|---|---|
| 138 | NH—$C_2H_4$—$K_1$ | H | H | H | H | H | 1 | Cl | Orange-brown. |
| 139 | NH—C₆H₃(CH₃)(CH₂—$K_1$) | H | H | H | H | H | 1 | Cl | Red-brown. |
| 140 | NH—C₆H₃(CH₃)(CH₂—$K_1$) | H | H | H | NH—C₆H₃(CH₃)(CH₂—$K_1$) | H | 1 | Cl | Red-violet. |
| 141 | OH | H | H | NH—$C_2H_4$—$K_1$ | H | H | 2 | Cl | Violet. |
| 142 | OH | H | H | NH—C₆H₄—NH—CO—CH₂—$K_1$ | H | H | 1 | Cl | Blue-violet. |
| 143 | OH | H | H | NH—C₆H₃(CH₃)(CH₂—$K_1$) | H | H | 1 | Cl | Violet. |
| 144 | OH | Blue | H | NH—$C_2H_4$—$K_1$ | OH | As in $R_4$ | 2 | Cl | Blue. |
| 145 | OH | H | H | NH—C₆H₃(CH₃)(CH₂—$K_1$) | NH—C₆H₃(CH₃)(CH₂—$K_1$) | OH | 2 | Cl | Blue-green. |
| 146 | $NH_2$ | H | H | NH—C₆H₂(CH₃)₂(CH₂—$K_1$) | H | H | 1 | Cl | Violet-blue. |
| 147 | $NH_2$ | H | H | NH—C₆H₂(CH₃)(NH—CO—$C_2H_4$—$K_1$) | H | H | 1 | Cl | Do. |
| 148 | $NH_2$ | H | H | NH—C₆H₃(OCH₃)(N—CO—$C_2H_4$—$K_1$) | H | H | 1 | Cl | Blue. |
| 149 | $NH_2$ | $CH_3$ | H | NH—C₆H₃(CH₃)(CH₂—$K_1$) | H | H | 1 | Cl | Do. |

| Example No. | $R_1$ | $R_2$ | $R_3$ | $R_4$ | $R_5$ | $R_8$ | $n$ | $X$ | Shade of the dyeing on polyacrylonitrile fibers (I) |
|---|---|---|---|---|---|---|---|---|---|
| 150 | $NH_2$ | Br | H | NH—⌬(CH₂—K₁)(CH₃) | H | H | 1 | Cl | Blue; |
| 151 | $NH_2$ | $CH_3$ | H | NH—⌬(CH₃)(CH₂—NH—CO—CH₂K₁)(CH₃) | H | H | 1 | Cl | Violet-blue; |
| 152 | $NH_2$ | Cl | H | NH—⌬(CH₂—NH—CO—CH—CH₃)(K₁)(CH₃) | H | H | 1 | Cl | Blue; |
| 153 | NH—$CH_3$ | H | H | NH—$C_2H_4$—K₁ | H | H | 1 | Br | Do; |
| 154 | Same as above | H | H | Same as above | H | H | 1 | Cl | Do; |
| 155 | do | H | H | NH—⌬(CO—CH₂—K₁) | H | H | 1 | Cl | Do. |
| 156 | do | H | H | NH—CH₂—CHOH—CH₂—K₁ | H | H | 1 | Cl | Do. |
| 157 | $NH_2$ | $OCH_3$ | H | NH—⌬(CH₂—K₁)(CH₃) | H | H | 1 | Cl | Violet. |
| 158 | $NH_2$ | —O—⌬—$C_5H_{11}$ | H | NH—⌬(CH₃)(CH₂—K₁)(CH₃) | H | H | 1 | Cl | Do. |
| 159 | $NH_2$ | Same | H | NH—$C_3H_6$—K₁ | H | H | 1 | Cl | Do; |
| 160 | —NH—⌬(CH₂—K₁)(CH₃) | H | H | NH—⌬(CH₃)(CH₂—K₁)(CH₃) | H | H | 2 | Cl | Green; |
| 161 | —NH—⌬(CH₃)(CH₂—NH—CO—CH₂—K₁) | H | H | NH—⌬(CH₃)(CH₂—NH—CO—CH₂—K₁) | H | H | 2 | Cl | Do; |

| Example No. | $R_1$ | $R_2$ | $R_3$ | $R_4$ | $R_5$ | $R_8$ | $n$ | X | Shade of the dyeing on polyacrylonitrile fibers (I) |
|---|---|---|---|---|---|---|---|---|---|
| 162 | CH₃ CH₂-NH-CO-CH-CH₃ (K₁) on dimethylaniline-NH- ring | H | H | CH₃ CH₂-NH-CO-CH-CH₃ (K₁) on dimethylaniline-NH- ring | H | H | 2 | Cl | Blue. |
| 163 | CO-CH₂-K₁ on phenyl-NH- | H | H | CO-CH₂-K₁ on phenyl-NH- | H | H | 2 | Cl | Green. |
| 164 | dimethylaniline-NH- with NH-CO-CH₂-K₁ | H | H | dimethylaniline-NH- with NH-CO-CH₂-K₁ | H | H | 1 | Cl | Blue-green. |
| 165 | NH₂ | $R_2$ together with $R_3$ —CO—N-C₂H₄-K₁ —CO— | | NH₂ | H | H | 1 | Cl | Blue. |

The following are shown as examples from the anthraquinone pyridine and pyridone series:

EXAMPLE 166

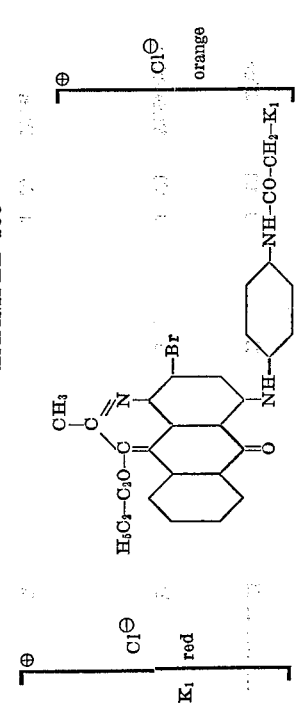

EXAMPLE 167

EXAMPLE 168

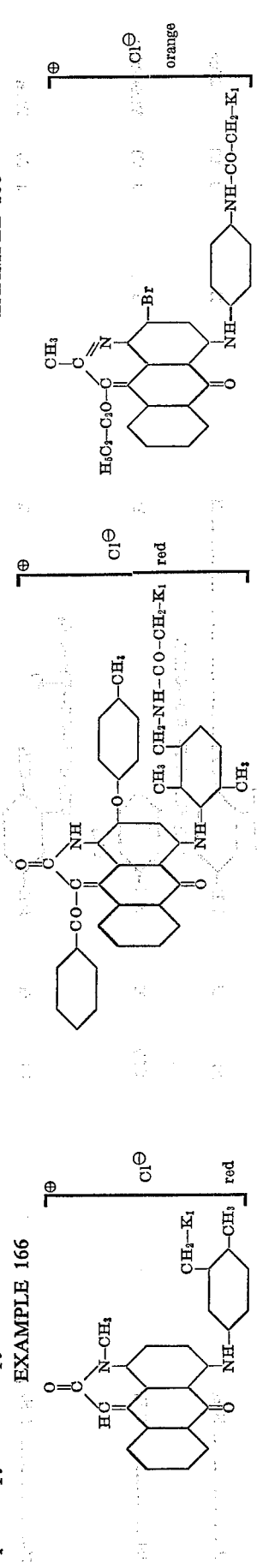

EXAMPLE 169

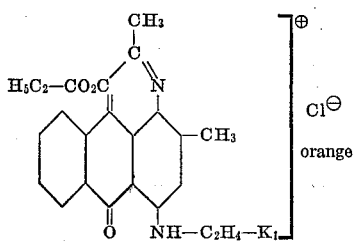

EXAMPLE 170

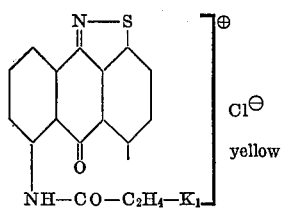

EXAMPLE 171

4.46 parts of 1,4 - di - (2'-, 6' - dimethyl) - aminoanthraquinone are added to 45 parts of surfuric acid monohydrate at 10–15° and the mixture stirred until everything all has dissolved. 3 parts of dichlorodimethyl ether are added in the temperature range of 10–15°. On completion of reaction, the reaction product is discharged onto 400 parts of ice, the precipitated compound filtered off and subsequently rinsed in cold water.

5.43 parts of 1,4-di-(2'-, 6'-dimethyl-3'-dichloromethyl)-phenylaminoanthraquinone are added to a mixture of tertiary butyl alcohol and ethanol at 20–30°. The mixture is heated to 80° and at this temperature 1,5 parts of symmetric diethyl hydrazine, is dissolved in 10 parts of ethanol, are added dropwise in the course of 1 hour. On completion of reaction the solvent is distilled off with vacuum, and the dry residue recrystallized from water/ ethanol. A good yield is obtained of the blue dye of the formula

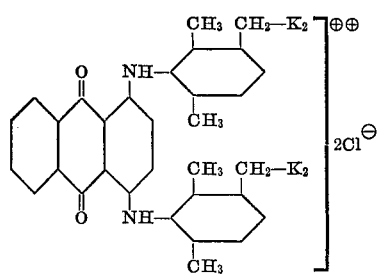

EXAMPLE 172

3.16 parts of 1-methylamino-4-bromoanthraquinone are stirred into 150 parts of iso-amyl alcohol, 1,3 parts of anhydrous potassium acetate, 1 part of cuprous chloride, 1 part of copper benzene and 1 part of chloroethyl amine are added and the mass heated at 100–130°. It is stirred at this temperature until condensation is complete and then unloaded onto 400 parts of ice. The precipitate is filtered off, washed with water until neutral, and then entered into 500 parts of dioxane, heated at 60° and filtered free from undissolved constituents. The filtrate is then run onto ice and the pure 1-methylamino-4-chlorethylaminoanthraquinone filtered off.

The condensation reaction with the asymmetrical diethyl hydrazine proceeds similarly to the reaction described in the preceding example. The blue dye obtained has the formula

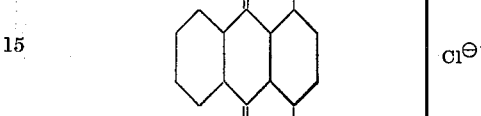

The identical dye is arrived at by starting from 1-methylamino-4-hydroxyanthraquinone in the leuco form, condensing with chlorethyl amine with the addition of boric acid, and quaternizing with diethyl hydrazine in the above-described manner.

EXAMPLE 173

9.8 parts of the monochloromethylated reaction product of 1-methylamino-4-toluidinoanthraquinone obtained by reaction with dichlorodimethyl ether and of melting point 190–192° are added to 90 parts of methanol, the mixture subsequently brought to the boil and a solution of 2,5 parts of 1,1-di-ethylhydrazine in 10 parts of methanol dropped in at this temperature. The temperature is maintained at 65–70° for 24 hours and the mixture then left to cool.

The precipitate formed is filtered off, washed with methanol and dried. It dissolves in concentrated sulfuric acid with a green-blue, and in water a blue coloration, and has the formula

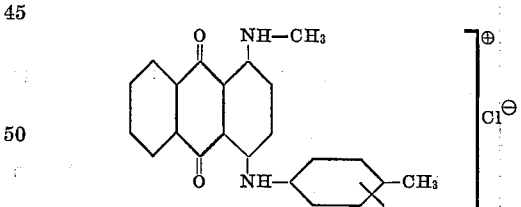

Polyacrylonitrile fibers are dyed in brilliant, greenish blue shades by this dye.

Further dyestuffs are enumerated in the following Table 3. The symbols $R_1$, $R_2$, $R_3$, $R_4$, $R_5$ $R_8$ in the general Formula XII

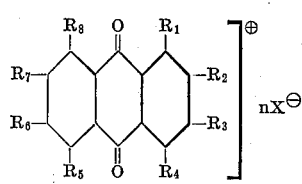

have the meanings given in the Table 2.

TABLE 3

| Example No. | R₁ | R₂ | R₃ | R₄ | R₅ | R₈ | n | X | Shade of the dyeing on polyacrylonitrile (I) |
|---|---|---|---|---|---|---|---|---|---|
| 174 | NH-C₂H₄-K₂ | H | H | H | H | H | 1 | Cl | Orange-brown. |
| 175 | NH-C₆H₃(CH₃)(CH₂-K₂) | H | H | H | H | H | 1 | Cl | Red-brown. |
| 176 | Same as above | H | H | H | NH-C₆H₃(CH₃)(CH₂-K₂) | H | 2 | Cl | Red-violet. |
| 177 | OH | H | H | NH-C₂H₄-K₂ | H | H | 1 | Cl | Violet. |
| 178 | OH | H | H | NH-C₆H₄(CH₃)(CH₂-K₂) | H | H | 1 | Cl | Blue-violet. |
| 179 | OH | H | H | NH-C₂H₄-N(C₂H₄OH)-C₂H₄-K₂ | H | H | 1 | Cl | Violet. |
| 180 | OH | H | H | NH-C₆H₄(CH₃)(CH₂-K₂) | H | H | 1 | Cl | Do. |
| 181 | OH | H | H | NH-C₂H₄-K₂ | OH | As R₄ | 2 | Cl | Blue. |
| 182 | OH | H | H | NH-C₆H₄(CH₃)(CH₂-K₂) | NH-C₆H₄(CH₃)(CH₂-K₂) | OH | 2 | Cl | Blue-green. |
| 183 | NH₂ | H | H | NH-C₆H₃(CH₃)₂(CH₂-K₂) | H | H | 1 | Cl | Violet-blue. |
| 184 | NH₂ | H | H | NH-C₆H₂(CH₃)₂(NH-CO-CH₂-N(C₂H₄CN)-C₂H₄-NH₂)(CH₃) | H | H | 1 | Cl | Do. |
| 185 | NH-CH₃ | H | H | NH-C₆H₄(CH₃)(CH₂-K₂) | H | H | 1 | Cl | Blue-green. |
| 186 | NH₂ | H | H | N(CH₃)-CO-C₂H₄-K₂ | H | H | 1 | Cl | Blue. |

TABLE 3

| Example No. | R₁ | R₂ | R₃ | R₄ | R₅ | R₈ | n | X | Shade of the dyeing on polyacrylonitrile (I) |
|---|---|---|---|---|---|---|---|---|---|
| 187 | NH₂ | CH₃ | H | NH—C₆H₄(CH₃)—K₅ (with CH₃) | H | H | 1 | Cl | Blue. |
| 188 | NH₂ | Br | H | NH—C₆H₄(CH₃)—K₂ | H | H | 1 | Cl | Do. |
| 189 | NH₂ | CH₃ | H | NH—C₆H₃(CH₃)(CH₃CH₂—NH—CO—CH₂—K₂) | H | H | 1 | Cl | Violet-blue. |
| 190 | NH₂ | Cl | H | NH—C₆H₄(CH₃)—CH₂—NH—CO—CH—CH₃ (with C₂H₅, N—C₃H₇, NH₂) | H | H | 1 | Cl | Blue. |
| 191 | NH—CH₃ | H | H | NH—C₂H₄—N—CH₃ (with C₂H₅, NH₂) | H | H | 1 | Br | Do. |
| 192 | Same as above | H | H | NH—C₂H₄—N—C₂H₅ (with C₂H₅, N—(C₂H₅)₂) | H | H | 1 | Cl | Do. |
| 193 | do. | H | H | NH—C₆H₄(CO—CH₂—N—CH₃ with C₂H₅, NH—CH₃) | H | H | 1 | Cl | Do. |
| 194 | do. | H | H | NH—CH₂—CHOH—CH₂—K₂ | H | H | 1 | Cl | Do. |
| 195 | NH₂ | OCH₃ | H | NH—C₆H₄(CH₃)—K₂ (with CH₃) | H | H | 1 | Cl | Violet |
| 196 | NH₂ | —O—C₆H₁₀—C₅H₁₁ | | NH—C₆H₃(CH₃)(CH₃CH₂—K₂) | H | H | 1 | Cl | Do. |
| 197 | NH₂ | Same | H | NH—C₃H₆—K₇ | H | H | 1 | Cl | Do. |

TABLE 3

| Example No. | R₁ | R₂ | R₃ | R₄ | R₅ | R₈ | n | X | Shade of the dyeing on polyacrylonitrile (I) |
|---|---|---|---|---|---|---|---|---|---|
| 198 | NH—⬡—CH₃, CH₂—K₂ | H | H | NH—⬡—CH₃, CH₂—K₂ | H | H | 1 | Cl | Green. |
| 199 | NH—⬡—CH₃, CH₂—NH—CO—CH₃—K₂ | H | H | NH—⬡—CH₃, CH₂—NH—CO—CH₃—K₂ | H | H | 2 | Cl | Do. |
| 200 | NH—⬡—CH₃, CH₂—NH—CO—CH—CH₃, K₂ | H | H | NH—⬡—CH₃, CH₂—NH—CO—CH—CH₃, K₂ | H | H | 2 | Cl | Blue. |
| 201 | NH—⬡—CO—CH₂—K₂ | H | H | NH—⬡—CO—CH₂—K₂ | H | H | 2 | Cl | Green. |
| 202 | NH—⬡—CH₃, CH₃ | H | H | NH—⬡—NH—CO—CH₂—N—C₂H₅, CH₃, NH₂ | H | H | 1 | Cl | Blue-green. |
| 203 | NH₂ | R₂ together with R₃ —CO—N—C₂H₄—K₂ —CO— | | NH₂ | H | H | 1 | Cl | Blue. |

The following are shown as examples from the anthraquinone pyridine and pyridone series:

EXAMPLE 204

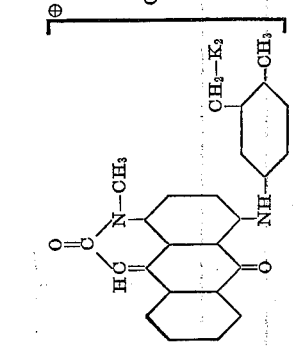
red

EXAMPLE 205

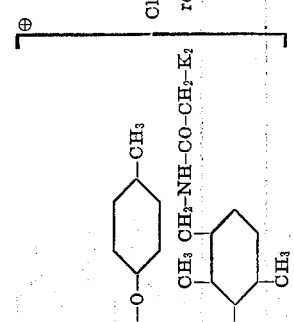
red

EXAMPLE 206

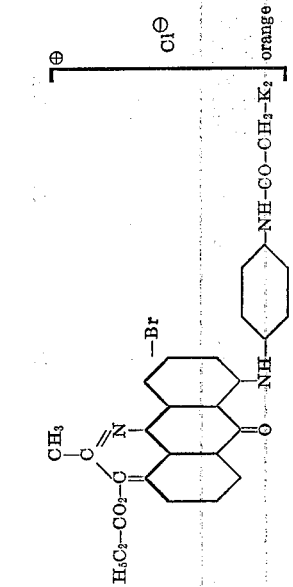
orange

EXAMPLE 207

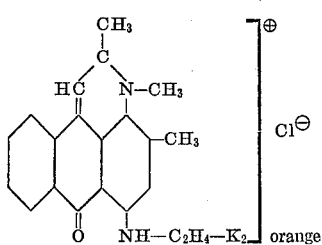

orange

EXAMPLE 208

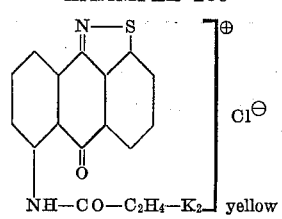

yellow

Further dyestuffs are enumerated in the following Table 4.

The symbols $R_1$, $R_2$, $R_3$, $R_4$, $R_5$, $R_6$, $R_7$, $R_8$ in the general Formula XII in col. 4 have the meaning given in the Table 4.

| Ex. No. | $R_1$ | $R_2$ | $R_3$ | $R_4$ |
|---|---|---|---|---|
| 209 | $NH_2$ | Br | H | $NH(CH_2)_3K_4$ |
| 210 | $NH_2$ | Cl | H | $NH(CH_2)_3K_2$ |
| 211 | $NH_2$ | Br | H | $NH(CH_2)_2K_1$ |
| 212 | $NH_2$ | Cl | H | $NH(CH_2)_2K_5$ |
| 213 | $NH_2$ | $COOC_2H_7-K_7$ | H | $NH_2$ |
| 214 | $NH_2$ | $COOC_2H_4-K_1$ | H | H |
| 215 | $NH_2$ | $COOC_3H_6-K_4$ | H | $NH_2$ |
| 216 | $NH_2$ | $COOC_2H_4-K_2$ | H | OH |
| 217 | $NH_2$ | $CONH(CH_2)_3-R_4$ | H | $NH_2$ |
| 218 | $NH_2$ | $CONH(CH_2)_3-K_1$ | H | H |

| Ex. No. | $R_5$ | $R_6$ | $R_7$ | $R_8$ | Shade of the dyeing on polyacrylonitrile (I) |
|---|---|---|---|---|---|
| 209 | H | H | H | H | Blue. |
| 210 | H | H | H | H | Do. |
| 211 | H | H | H | H | Do. |
| 212 | H | H | H | H | Do. |
| 213 | H | H | H | H | Do. |
| 214 | H | H | H | H | Orange. |
| 215 | H | H | H | H | Blue. |
| 216 | H | H | H | H | Violet. |
| 217 | H | H | H | H | Reddish-blue. |
| 218 | H | H | H | H | Orange. |

| Ex. No. | $R_1$ | $R_2$ | $R_3$ | $R_4$ |
|---|---|---|---|---|
| 219 | $NH_2$ | $CONHC_2H_4-K_2$ | H | $NH_2$ |
| 220 | $NH_2$ | $CONH-\langle\rangle-CH_2-K_4$ | H | $NH_2$ |
| 221 | $NH_2$ | Same as above | H | H |
| 222 | OH | H | H | $NH-\langle\rangle-NHCOCH_2K_2$ |
| 223 | OH | H | H | $NH-\langle\rangle$ with $NHCOCH_2-K_5$ |
| 224 | $NH_2$ | CN | H | $NH-\langle\rangle-NHCOCH_2-K_1$ |
| 225 | $NHCH_3$ | H | H | $NHC_2H_4NHCOCH_2K_1$ |
| 226 | OH | H | H | $NH-\langle\rangle-NHCOCH_2NHC_2H_4-K_2$ |

| Ex. No. | $R_5$ | $R_6$ | $R_7$ | $R_8$ | Shade of the dyeing on polyacrylonitrile (I) |
|---|---|---|---|---|---|
| 219 | H | H | H | H | Reddish-blue. |
| 220 | H | H | H | H | Blue. |
| 221 | H | H | H | H | Orange-red. |
| 222 | H | H | H | H | Violet. |
| 223 | H | H | H | H | Violet-blue. |
| 224 | H | H | H | H | Greenish-blue. |
| 225 | H | H | H | H | Blue. |
| 226 | H | H | H | H | Reddish-blue. |

| Ex. No. | $R_1$ | $R_2$ | $R_3$ | $R_4$ |
|---|---|---|---|---|
| 227 | OH | H | H | $NH-\langle\rangle-NHCOCH_2NHC_3H_6-K_4$ |
| 228 | $NH-\langle\rangle-COC_2H_4K_5$ | H | H | H |

| Ex. No. | $R_1$ | $R_2$ | $R_3$ | $R_4$ |
|---|---|---|---|---|
| 229 | NH—⌬—$COC_2H_4K_6$ | H | H | OH |
| 230 | $NH_2$ | $SC_2H_4K_1$ | H | OH |
| 231 | $NH_2$ | $SC_2H_4K_2$ | H | $NHC_6H_5$ |
| 232 | $NH_2$ | $SC_2H_4K_3$ | H | NH—⌬—$NH_2$ |
| 233 | $NH_2$ | $SC_2H_4K_4$ | H | NH—⌬—$NHCH_3$ |
| 234 | $NH_2$ | $OC_2H_4K_5$ | H | $NH_2$ |

| Ex. No. | $R_5$ | $R_6$ | $R_7$ | $R_8$ | Shade of the dyeing on polyacrylonitrile (I) |
|---|---|---|---|---|---|
| 227 | H | H | H | H | Reddish-blue |
| 228 | H | H | H | H | Red-violet. |
| 229 | H | H | H | H | Violet. |
| 230 | H | H | H | H | Bluish-red. |
| 231 | H | H | H | H | Blue. |
| 232 | H | H | H | H | Green-blue. |
| 233 | H | H | H | H | Do. |
| 234 | H | H | H | H | Violet. |

| Ex. No. | $R_1$ | $R_2$ | $R_3$ | $R_4$ |
|---|---|---|---|---|
| 235 | $NH_2$ | $OC_2H_4K_5$ | H | S—⌬ |
| 236 | $NH_2$ | $S(CH_2)_6$—$K_1$ | H | $NHC_6H_5$ |
| 237 | $NH_2$ | S—⌬—$CH_2K_1$ | H | $NH_2$ |
| 238 | $NH_2$ | S—⌬—$CH_2K_7$ | H | OH |
| 239 | $NH_2$ | S—⌬—$CH_2K_1$ | H | $NHC_6H_5$ |
| 240 | $NH_2$ | $SC_2H_4K_4$ | H | NH—⌬—H |
| 241 | $NH_2$ | —O—$CH_2$—$CH_2$—$K_1$ | H | OH |
| 242 | $NH_2$ | —O—$CH_2$—$CH_2$—$CH_2$—$K_4$ | H | OH |

| Ex. No. | $R_5$ | $R_6$ | $R_7$ | $R_8$ | Shade of the dyeing on polyacrylonitrile (I) |
|---|---|---|---|---|---|
| 235 | H | H | H | H | Red. |
| 236 | H | H | H | H | Greenish-blue. |
| 237 | H | H | H | H | Violet-blue. |
| 238 | H | H | H | H | Bluish-red. |
| 239 | H | H | H | H | Greenish-blue. |
| 240 | H | H | H | H | Blue. |
| 241 | H | H | H | H | Red. |
| 242 | H | H | H | H | Red. |

| Ex. No. | $R_1$ | $R_2$ | $R_3$ | $R_4$ |
|---|---|---|---|---|
| 243 | $NH_2$ | —O—$CH_2$—$CH_2$—$CH_2$—$CH_2$—$K_6$ | H | OH |
| 244 | $NH_2$ | —O—⌬($CH_2K_2$)($CH_3$) | H | OH |
| 245 | $NH_2$ | —O—⌬($CH_3$)($CH_2$—$K_5$) | H | OH |

| Ex. No. | R₁ | R₂ | R₃ | R₄ |
|---|---|---|---|---|
| 246 | $NH_2$ | —O—C₆H₃(CH₃)—CH₂—K₇ (2-methyl-phenoxy with CH₂-K₇) | H | OH |
| 247 | $NH_2$ | —O—C₆H₃(CH₂-K₆)—O—CH₃ | H | OH |
| 248 | $NH_2$ | —O—C₆H₃(CH₂-K₁)—O—C₄H₉(n) | H | OH |
| 249 | $NH_2$ | —O—C₆H₃(OCH₃)—CH₂-K₂ | H | OH |

| Ex. No. | R₅ | R₆ | R₇ | R₈ | Shade of the dyeing on polyacrylonitrile (I) |
|---|---|---|---|---|---|
| 243 | H | H | H | H | Red. |
| 244 | H | H | H | H | Red. |
| 245 | H | H | H | H | Red. |
| 246 | H | H | H | H | Red. |
| 247 | H | H | H | H | Red. |
| 248 | H | H | H | H | Red. |
| 249 | H | H | H | H | Red. |

| Ex. No. | R₁ | R₂ | R₃ | R₄ |
|---|---|---|---|---|
| 250 | —NH—C₆H₃(CH₂-K₄)—CH₃ | H | H | —NH—C₆H₃(CH₂-K₄)—CH₃ |
| 251 | —NH—C₆H₄—CH₂-K₁ | H | H | —NH—C₆H₄—CH₂-K₁ |
| 252 | $NH_2$ | H | H | —NH—C₆H₃(CH₃)—CH₂-K₁ |
| 253 | —NH—CH₃ | H | H | —NH—CH₂—CH₂-K₅ |
| 254 | Same as above | H | H | —NH—C₆H₄—O—CH₂CH₂—O—CH₂CH₂-K₆ |
| 255 | $NH_2$ | Cl | H | —NH—CH₂—CH₂-K₁ |
| 256 | $NH_2$ | Br | H | —NH—CH₂—CH₂-K₃ |

| Ex. No. | R₅ | R₆ | R₇ | R₈ | Shade of the dyeing on polyacrylonitrile (I) |
|---|---|---|---|---|---|
| 250 | H | H | H | H | Green. |
| 251 | H | H | H | H | Do. |
| 252 | H | H | H | H | Reddish-blue. |
| 253 | H | H | H | H | Blue. |
| 254 | H | H | H | H | Greenish-blue. |
| 255 | H | H | H | H | Blue. |
| 256 | H | H | H | H | Do. |

| Ex. No. | R₁ | R₂ | R₃ | R₄ |
|---|---|---|---|---|
| 257 | OH | H | H | —NH—CH₂—CH₂-K₄ |
| 258 | $NH_2$ | H | H | —NH—C₆H₄—SO₂—NH—CH₂CH₂-K₁ |
| 259 | OH | H | H | —NH—C₆H₄—CH₂—CH₂-K₁ |
| 260 | $NH_2$ | CF₃ | H | —NH—CH₂—CH₂-K₁ |

3,583,998

| Ex. No. | R₁ | R₂ | R₃ | R₄ |
|---|---|---|---|---|
| 261 | OH | H | H | —NH—C₆H₃(SO₂—NH—CH₂—CH₂—K)— |
| 262 | NH₂ | —O—CH₂—CH₂—K₇ | H | OH |
| 263 | OH | H | H | —NH—C₆H₃(NO₂)—CH₂—CH₂—K₄ |

| Ex. No. | R₅ | R₆ | R₇ | R₈ | Shade of the dyeing on polyacrylonitrile (I) |
|---|---|---|---|---|---|
| 257 | NO₂ | H | H | OH | Green-blue. |
| 258 | H | H | H | NO₂ | Violet-blue. |
| 259 | OH | H | H | H | Blue. |
| 260 | H | H | H | OH | Green-blue. |
| 261 | NO₂ | H | H | H | Do. |
| 262 | H | H | H | H | Red. |
| 263 | —NH—C₆H₃(NO₂)—CH₂—CH₂—K₄ | H | H | H | Blue. |

| Ex. No. | R₁ | R₂ | R₃ | R₄ |
|---|---|---|---|---|
| | | R₂ together with R₃: | | |
| 264 | NH₂ | —CO—N(CH₂—CH₂—CH₂—K₆)—CO— | | NH₂ |
| 265 | NH₂ | —CO—N(CH₂—CH₂—K₅)—CO— | | NH₂ |
| 266 | NH₂ | —CO—N(CH₂—CH(CH₃)—K₄)—CO— | | NH₂ |
| 267 | NH₂ | —CO—N(CH₂—CH(OH)—CH₂—K₆)—CO— | | NH₂ |

| Ex. No. | R₅ | R₆ | R₇ | R₈ | Shade of the dyeing on polyacrylonitrile (I) |
|---|---|---|---|---|---|
| 264 | H | H | H | H | Blue-green. |
| 265 | H | H | H | H | Do. |
| 266 | H | H | H | H | Do. |
| 267 | H | H | H | H | Do. |

| Ex. No. | R₁ | R₂ | R₃ | R₄ |
|---|---|---|---|---|
| 268 | NH₂ | —CO—NH—CH₂—CH₂—CH₂—K₂ | H | H |
| 269 | NH₂ | —CO—NH—CH₂—CH₂—K₅ | H | H |
| 270 | NH₂ | —CO—NH—CH₂—CH₂—K₁ | H | OH |
| 271 | NH₂ | —CO—NH—CH₂—CH₂—K₄ | H | NH—CH₃ |
| 272 | NH₂ | —CO—NH—CH₂—(CH₂)₂—K₇ | H | NH—C₆H₅ |
| 273 | NH₂ | —CO—NH—C₃H₆—K₁ | H | NH—C₆H₄—CH₃ |
| 274 | NH₂ | —CO—NH—C₃H₆—K₆ | H | NH₂ |
| 275 | NH₂ | —CO—NH—C₃H₆—K₅ | H | NH—CH₃ |
| 276 | NH | —CO—NH—C₃H₆—K₄ | H | NH—CH₂—CH₃ |

| Ex. No. | $R_5$ | $R_6$ | $R_7$ | $R_8$ | Shade of the dyeing on polyacrylonitrile (I) |
|---|---|---|---|---|---|
| 268 | H | H | H | H | Orange. |
| 269 | H | H | H | H | Do. |
| 270 | H | H | H | H | Red. |
| 271 | H | H | H | H | Blue. |
| 272 | H | H | H | H | Do. |
| 273 | H | H | H | H | Do. |
| 274 | H | H | H | H | Reddish-blue. |
| 275 | H | H | H | H | Blue. |
| 276 | H | H | H | H | Do. |

| Ex. No. | $R_1$ | $R_2$ | $R_3$ | $R_4$ |
|---|---|---|---|---|
| 277 | $NH_2$ | H | H | $NH-CH_2-\underset{OH}{CH}-CH_2-K_5$ |
| 278 | $NH_2$ | H | H | $NH-\underset{CH_3}{CH}-CH_2-CH_2-CH_2-K_7$ |
| 279 | $NH_2$ | $-CO-NH-\langle\text{ring}\rangle-CH_2-K_1$ | H | $NH_2$ |
| 280 | $NH-CH_2-\underset{\substack{CH_2-CH_2-K_1}}{\overset{OH}{CH}}-CH_2-S$ | H | H | $NH-CH_2-\underset{\substack{K_1-CH_2-CH_2}}{\overset{OH}{CH}}-CH_2-S$ |
| 281 | $NH_2$ | $-SO_2-NH-CH_2-CH_2-K_4$ | H | H |
| 282 | $NH-\langle\text{ring}\rangle-O-C_2H_4-K_2$ | H | H | $NH-\langle\text{ring}\rangle-OC_2H_4K_2$ |

| Ex. No. | $R_5$ | $R_6$ | $R_7$ | $R_8$ | Shade of the dyeing on polyacrylonitrile (I) |
|---|---|---|---|---|---|
| 277 | H | H | H | H | Blue. |
| 278 | H | H | H | H | Do. |
| 279 | H | H | H | H | Reddish-blue. |
| 280 | H | H | H | H | Violet. |
| 281 | H | H | H | H | Red. |
| 282 | H | H | H | H | Green. |

| Ex. No. | $R_1$ | $R_2$ | $R_3$ | $R_4$ |
|---|---|---|---|---|
| 283 | $NH-CH_2-\underset{OH}{CH}-CH_2K_5$ | H | H | $NH-CH_2-\underset{OH}{CH}-CH_2K_5$ |
| 284 | $NH_2$ | H | H | $NH-C_3H_6-K_8$ |
| 285 | $R_1$ together with $R_2$: 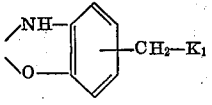 | | H | H |
| 286 | $NHC_2H_5$ | H | H | H |
| 287 | $NHCH_3$ | H | H | H |
| 288 | $NH(CH_2)_3CH_3$ | H | H | H |
| 289 | $NH$–Cyclohexyl | H | H | H |

| Ex. No. | $R_5$ | $R_6$ | $R_7$ | $R_8$ | Shade of the dyeing on polyacrylonitrile (I) |
|---|---|---|---|---|---|
| 283 | H | H | H | H | Violet-blue. |
| 284 | H | H | H | H | Do. |
| 285 | H | H | H | H | Red. |
| 286 | H | $SO_2NH(CH_2)_3K_4$ | H | H | Reddish-violet. |
| 287 | H | Same as above | H | H | Do. |
| 288 | H | $SO_2NH(CH_2)_4K_1$ | H | H | Do. |
| 289 | H | $SO_2NH(CH_2)_2K_4$ | H | H | Do. |

| Ex. No. | $R_1$ | $R_2$ | $R_3$ | $R_4$ |
|---|---|---|---|---|
| 290 | $NHC_2H_5$ | H | H | H |
| 291 | $NH_2$ | H | H | H |
| 292 | $NH_2$ | Br | H | $-HN-\langle\text{ring-}CONH(CH_2)_3K_7\rangle$ |
| 293 | $NH_2$ | Br | H | $-HN-\langle\text{ring-}CONH(CH_2)_2K_1\rangle$ |

| Ex. No. | R₁ | R₂ | R₃ | R₄ |
|---|---|---|---|---|
| 294 | $NH_2$ | Br | H | $-HN-C_6H_4-CONH(CH_2)_3K_5$ |
| 295 | $NH_2$ | Br | H | $-HN-C_6H_4-CONH-(CH_2)_3K_4$ |
| 296 | $NH_2$ | Br | H | $-HN-C_6H_4-CONH(CH_2)_2K_5$ |
| 297 | $NH_2$ | Br | H | $-HN-C_6H_4-CONH(CH_2)_4K_1$ |

| Ex. No. | R₅ | R₆ | R₇ | R₈ | Shade of the dyeing on polyacrylonitrile (I) |
|---|---|---|---|---|---|
| 290 | H | H | $-SO_2-NH-(CH_2)_3-K_6$ | H | Violet. |
| 291 | H | $SO_2NH(CH_2)_3K_5$ | H | H | Red-orange. |
| 292 | H | H | H | H | Blue. |
| 293 | H | H | H | H | Do. |
| 294 | H | H | H | H | Do. |
| 295 | H | H | H | H | Do. |
| 296 | H | H | H | H | Do. |
| 297 | H | H | H | H | Do. |

| Ex. No. | R₁ | R₂ | R₃ | R₄ |
|---|---|---|---|---|
| 298 | $NH_2$ | Br | H | $-HN-C_6H_4-CONHCH_2CH(CH_3)-CH_2K_6$ |
| 299 | $NH(CH_2)_3K_4$ | H | H | OH |
| 300 | $NH(CH_2)_3K_5$ | H | H | $NHCH_3$ |
| 301 | $NH_2$ | $-OC_2H_4-K_3$ | H | $-NHC_6H_{11}$ (cyclohexyl) |
| 302 | $NH_2$ | $-OC_2H_4-K_4$ | H | $NHC_6H_5$ |
| 303 | $NH_2$ | $-OCH_2CHOH-CH_2K_1$ | H | Same as above. |
| 304 | $NH_2$ | $-OC_2H_4-K_7$ | H | $p-NHC_6H_4COCH_3$ |
| 305 | $NH_2$ | $-OC_2H_4-K_7$ | H | $NHC_6H_4N(CH_3)-COCH_3$ |

| Ex. No. | R₅ | R₆ | R₇ | R₈ | Shade of the dyeing on polyacrylonitrile (I) |
|---|---|---|---|---|---|
| 298 | H | H | H | H | Blue. |
| 299 | OH | H | H | OH | Greenish-blue. |
| 300 | H | H | H | H | Blue. |
| 301 | H | H | H | H | Violet. |
| 302 | H | H | H | H | Do. |
| 303 | H | H | H | H | Do. |
| 304 | H | H | H | H | Do. |
| 305 | H | H | H | H | Do. |

| Ex. No. | R₁ | R₂ | R₃ | R₄ |
|---|---|---|---|---|
| 306 | $NH_2$ | Br | H | $NH-C_6H_4-CONH(CH_2)_3K_1$ |
| 307 | $NH_2$ | Br | H | $NH-C_6H_4-CONH(CH_2)_2K_7$ |
| 308 | $NH_2$ | Br | H | $NH-C_6H_4-CONH(CH_2)_3K_1$ |
| 309 | $NH_2$ | Br | H | $NH-C_6H_4-CONHCH_2CH(CH_3)CH_2K_3$ |
| 310 | $NH_2$ | Br | H | $NH-C_6H_4-CONH(CH_2)_2K_4$ |

| Ex. No. | $R_1$ | $R_2$ | $R_3$ | $R_4$ |
|---|---|---|---|---|
| 311 | $NH_2$ | Br | H | NH—⌬—$(CH_2)_3K_1$ with CONH |
| 312 | $NH_2$ | Br | H | NH—⌬—$(CH_2)_4K_2$ with CONH |

| Ex. No. | $R_5$ | $R_6$ | $R_7$ | $R_8$ | Shade of the dyeing on polyacrylonitrile (I) |
|---|---|---|---|---|---|
| 306 | H | H | H | H | Blue. |
| 307 | H | H | H | H | Do. |
| 308 | H | H | H | H | Do. |
| 309 | H | H | H | H | Do. |
| 310 | H | H | H | H | Do. |
| 311 | H | H | H | H | Do. |
| 312 | H | H | H | H | Do. |

| Ex. No. | $R_1$ | $R_2$ | $R_3$ | $R_4$ |
|---|---|---|---|---|
| 313 | $NHCH_3$ | H | H | $NH(CH_2)_3K_4$ |
| 314 | Same as above | H | H | $NH(CH_2)_2K_6$ |
| 315 | do | H | H | $NH(CH_2)_3CH(CH_3)-K_1$ |
| 316 | do | H | H | H |
| 317 | $NH(CH_2)_3K_4$ | H | H | H |
| 318 | $NH_2$ | H | H | $NH(CH_2)_3K_4$ |
| 319 | $NH(CH_2)_2OH$ | H | H | $NH(CH_2)_3K_5$ |

| Ex. No. | $R_5$ | $R_6$ | $R_7$ | $R_8$ | Shade of the dyeing on polyacrylonitrile (I) |
|---|---|---|---|---|---|
| 313 | H | H | H | H | Blue. |
| 314 | H | H | H | H | Do. |
| 315 | H | H | H | H | Do. |
| 316 | $NH(CH_2)_3K_1$ | H | H | H | Violet. |
| 317 | H | H | H | H | Yellowish-red. |
| 318 | H | H | H | H | Reddish-blue. |
| 319 | H | H | H | H | Blue. |

| Ex. No. | $R_1$ | $R_2$ | $R_3$ | $R_4$ |
|---|---|---|---|---|
| 320 | $NHC_6H_{11}$ | H | H | $NH(CH_2)_3K_4$ |
| 321 | $NH_2$ | H | H | H |
| 322 | $NH(CH_2)_2OH$ | H | H | H |
| 323 | $NHC_2H_5$ | H | H | H |
| 324 | $NH_2$ | H | H | $NH_2$ |
| 325 | $NH_2$ | H | H | OH |
| 326 | $NH_2$ | H | H | NH—⌬—$CH_2K_1$ |
| 327 | $NH_2$ | H | H | NH—⌬—$CH_2K_1$ |

| Ex. No. | $R_5$ | $R_6$ | $R_7$ | $R_8$ | Shade of the dyeing on polyacrylonitrile (I) |
|---|---|---|---|---|---|
| 320 | H | H | H | H | Blue. |
| 321 | $NH(CH_2)_3K_1$ | H | H | H | Yellowish red. |
| 322 | $NH(CH_2)_3K_2$ | H | H | H | Bluish-red. |
| 323 | H | H | H | $NH(CH_2)_3K_1$ | Bordeaux. |
| 324 | $NH(CH_2)_3K_4$ | H | H | H | Bluish-violet. |
| 325 | $NH(CH_2)_3K_6$ | H | H | H | Reddish-violet. |
| 326 | H | H | H | H | Reddish-blue. |
| 327 | H | H | H | H | Do. |

| Ex. No. | $R_1$ | $R_2$ | $R_3$ | $R_4$ |
|---|---|---|---|---|
| 328 | $NHCH_3$ | H | H | NH—⌬—$CH_2K_3$ |
| 329 | $NH_2$ | H | H | NH—⌬—$O(CH_2)_2K_4$ |
| 330 | $NH_2$ | H | H | NH—⌬—$S(CH_2)_2K_1$ |
| 331 | $NH_2$ | H | H | NH—⌬—$SO_2N(CH_3)-(CH_2)_2K_5$ |

| Ex. No. | R₁ | R₂ | R₃ | R₄ |
|---|---|---|---|---|
| 332 | OH | H | H | NH—⟨cyclohexyl with CH₂K₇ and CH₃⟩ |
| 333 | NH—⟨cyclohexyl with CH₃ and CH₂K₆⟩ | H | H | NH—⟨cyclohexyl with CH₂K₆ and CH₃⟩ |
| 334 | NH₂ | H | H | NH—⟨cyclohexyl with CH₂K₁ and OCH₃⟩ |

| Ex. No. | R₅ | R₆ | R₇ | R₈ | Shade of the dyeing on polyacrylonitrile (I) |
|---|---|---|---|---|---|
| 328 | H | H | H | H | Greenish. |
| 329 | H | H | H | H | Blue. |
| 330 | H | H | H | H | Do. |
| 331 | H | H | H | H | Do. |
| 332 | H | H | H | H | Violet. |
| 333 | H | H | H | H | Green. |
| 334 | H | H | H | H | Blue. |

| Ex. No. | R₁ | R² | R₃ | R₄ |
|---|---|---|---|---|
| 335 | NH(CH₂)₂OH | H | H | NH—⟨cyclohexyl⟩—CH₂K₇ |
| 336 | NH₂ | H | H | NH—⟨cyclohexyl⟩—N((CH₂)₂K₄)(CH₃) |
| 337 | NH(CH₂)₃CHK₄(CH₃) | H | H | H |
| 338 | NH₂ | H | H | NH(CH₂)₂K₄ |
| 339 | NH(CH₂)₂OH | H | H | NH(CH₂)₃CHK₅(CH₃) |
| 340 | NHC₆H₁₁ | H | H | NH(CH₂)₂K₄ |
| 341 | NH—⟨phenyl⟩—CH₃ | H | H | NH(CH₂)₃CHK₁(CH₃) |

| Ex. No. | R₅ | R₆ | R₇ | R₈ | Shade of the dyeing on polyacrylonitrile (I) |
|---|---|---|---|---|---|
| 335 | H | H | H | H | Blue. |
| 336 | H | H | H | H | Green-blue. |
| 337 | H | H | H | H | Yellowish-red. |
| 338 | H | H | H | H | Reddish-blue. |
| 339 | H | H | H | H | Blue. |
| 340 | H | H | H | H | Do. |
| 341 | H | H | H | H | Greenish-blue. |

| Ex. No. | R₁ | R² | R₃ | R₄ |
|---|---|---|---|---|
| 342 | NH₂ | H | H | H |
| 343 | NH(CH₂)₂OH | H | H | H |
| 344 | NH₂ | H | H | OH |
| 345 | NH₂ | H | H | NH₂ |

| Ex. No. | R₅ | R₆ | R₇ | R₈ | Shade of the dyeing on polyacrylonitrile (I) |
|---|---|---|---|---|---|
| 342 | NH(CH₂)₂K₂ | H | H | H | Yellowish-red. |
| 343 | NH(CH₂)₃CHK₃(CH₃) | H | H | H | Bluish-red. |
| 344 | NH(CH₂)₂K₄ | H | H | H | Reddish-violet. |
| 345 | NH(CH₂)₂K₇ | H | H | H | Bluish-violet. |

| Ex. No. | R₁ | R² | R₃ | R₄ |
|---|---|---|---|---|
| 346 | NH—CH₃ | H | H | NH—⟨cyclohexyl with CH₃, CH₃, CH₂K₁⟩ |

| Ex. No. | R₁ | R₂ | R₃ | R₄ |
|---|---|---|---|---|
| 347 | NH₂ | CH₃ | H | NH-[cyclohexyl with CH₃, CH₂-K₁, CH₃ substituents] |
| 348 | NH-[phenyl] | H | H | NH-CH₂-CHOH-CH₂-K₁ |
| 349 | NH₂ | O-CH₂-CH₂-K₁ | H | NH₂ |
| 350 | NH₂ | H | H | NH-[phenyl-CH₂-NH-CO-CH₂-K₁]-O-[phenyl] |
| 351 | NH₂ | H | H | NH-[phenyl]-O-[phenyl-CH₂-NH-CO-CH₂-K₁] |

| Ex. No. | R₅ | R₆ | R₇ | R₈ | Shade of the dyeing on polyacrylonitrile (I) |
|---|---|---|---|---|---|
| 346 | H | H | H | H | Blue. |
| 347 | H | H | H | H | Violet. |
| 348 | H | H | H | H | Greenish-blue. |
| 349 | H | H | H | H | Red-violet. |
| 350 | H | H | H | H | Blue. |
| 351 | H | H | H | H | Do. |

| Ex. No. | R₁ | R₂ | R₃ | R₄ |
|---|---|---|---|---|
| 352 | NH₂ | Br | H | NH-[phenyl with CH₃, CH₂-NH-CO-CH₂-K₁, CH₃] |
| 353 | NH₂ | Br | H | NH-[phenyl with CH₃, CH₂-K₁, CH₃, CH₃] |
| 354 | NH-CH₃ | H | H | NH-[phenyl with CH₃, CH₂-K₁, CH₃] |
| 355 | NH₂ | CH₃ | H | NH-[phenyl with CH₂-K₁, OCH₃] |
| 356 | NH-CH₃ | H | H | NH-[phenyl with CH₂-K₁, C₃H₇] |

| Ex. No. | R₅ | R₆ | R₇ | R₈ | Shade of the dyeing on polyacrylonitrile (I) |
|---|---|---|---|---|---|
| 352 | H | H | H | H | Reddish-blue. |
| 353 | H | H | H | H | Blue-violet. |
| 354 | H | H | H | H | Greenish-blue. |
| 355 | H | H | H | H | Blue. |
| 356 | H | H | H | H | Do. |

| Ex. No. | R₁ | R₂ | R₃ | R₄ |
|---|---|---|---|---|
| 357 | NH₂ | CH₃ | H | NH-[phenyl with CH₂-K₁, CH₃, CH₃] |
| 358 | NH₂ | H | H | NH-[phenyl with CH₂-K₁, CH₃, CH₃] |
| 359 | NH₂ | Br | H | NH-[phenyl with CH₂-K₁, OCH₃] |

| Ex. No. | R₁ | R₂ | R₃ | R₄ |
|---|---|---|---|---|
| 360 | NH₂ | H | H | NH—[2,4,6-trimethylphenyl with CH₂—K₁] |
| 361 | NH₂ | Br | H | NH—[2,4-dimethylphenyl with CH₂—K₁] |
| 362 | NHCH₂—CHOH—CH₂—K₁ | H | H | NH—[phenyl] |

| Ex. No. | R₅ | R₆ | R₇ | R₈ | Shade of the dyeing on polyacrylonitrile (I) |
|---|---|---|---|---|---|
| 357 | H | H | H | H | Blue. |
| 358 | H | H | H | H | Do. |
| 359 | H | H | H | H | Do. |
| 360 | H | H | H | H | Reddish-blue. |
| 361 | H | H | H | H | Do. |
| 362 | H | H | H | H | Do. |

| Ex. No. | R₁ | R₂ | R₃ | R₄ |
|---|---|---|---|---|
| 363 | NHCH₂—CHOH—CH₂—K₁ | H | H | NH—[phenyl]—Cl |
| 364 | NH₂ | OCH₂CH₂—K₁ | H | NH₂ |
| 365 | NHCH₂—CHOH—CH₂—K₁ | H | H | NH—[2,4,6-trimethylphenyl] |
| 366 | NH—CH₂—CHOH—CH₂—K₁ | H | H | NH—CH₂CH₂OH |
| 367 | NH₂ | Br | H | NH—CH₂CH₂CH₂—K₁ |
| 368 | NH₂ | CH₃ | H | NH—CH₂CH₂CH₂—K₁ |
| 369 | NH₂ | H | H | NH—CH₂CH₂CH₂—K₁ |
| 370 | NH₂ | O—CH₂CH₂—K₁ | H | NH—[phenyl] |

| Ex. No. | R₅ | R₆ | R₇ | R₈ | Shade of the dyeing on polyacrylonitrile (I) |
|---|---|---|---|---|---|
| 363 | H | H | H | H | Greenish-blue. |
| 364 | H | H | H | H | Red. |
| 365 | H | H | H | H | Reddish-blue. |
| 366 | H | H | H | H | Do. |
| 367 | H | H | H | H | Do. |
| 368 | H | H | H | H | Violet-blue. |
| 369 | H | H | H | H | Do. |
| 370 | H | H | H | H | Violet. |

| Ex. No. | R₁ | R₂ | R₃ | R₄ |
|---|---|---|---|---|
| 371 | NH₂ | O—CH₂CH₂—K₁ | H | NH—CH₃ |
| 372 | NH—[phenyl]—NHCOCH₂—K₁ | H | H | NH—[phenyl] |
| 373 | NH₂ | H | H | NH—[2,4-dimethylphenyl with CH₂—NHCOCH₂—K₁] |
| 374 | NH—CH₃ | H | H | NH—[2,4-dimethylphenyl with CH₂NHCOCH₂—K₁] |
| 375 | NH₂ | CH₃ | H | NH—[2,4-dimethylphenyl with CH₂NHCOCH₂—K₁] |

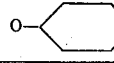

| Ex. No. | $R_1$ | $R_2$ | $R_3$ | $R_4$ |
|---|---|---|---|---|
| 376 | $NH_2$ | Br | | H Same as above. |
| 377 | $NH_2$ | O—⬡—$CH_2NHCOCH_2$—$K_1$ | H | OH |

| Ex. No. | $R_5$ | $R_6$ | $R_7$ | $R_8$ | Shade of the dyeing on polyacrylonitrile (I) |
|---|---|---|---|---|---|
| 371 | H | H | H | H | Violet |
| 372 | H | H | H | H | Green. |
| 373 | H | H | H | H | Blue. |
| 374 | H | H | H | H | Greenish blue. |
| 375 | H | H | H | H | Reddish blue. |
| 376 | H | H | H | H | Do. |
| 377 | H | H | H | H | Red. |

Formulae of representative dyes of the foregoing examples are as follows:

EXAMPLE 33

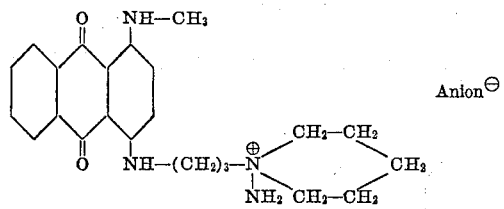

EXAMPLE 59

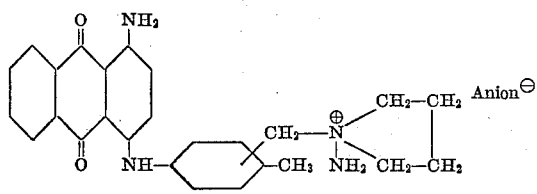

EXAMPLE 64

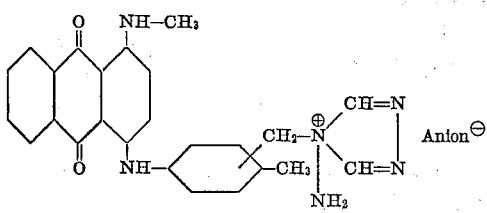

EXAMPLE 73

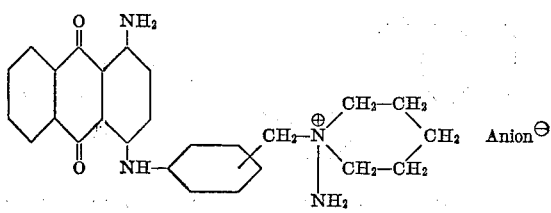

EXAMPLE 209

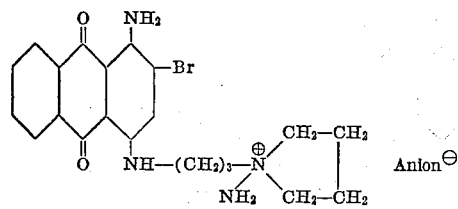

Having thus disclosed the invention what we claim is:
1. A basic dyestuff of the formula

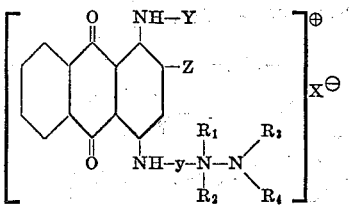

wherein
Y is a member selected from the group consisting of

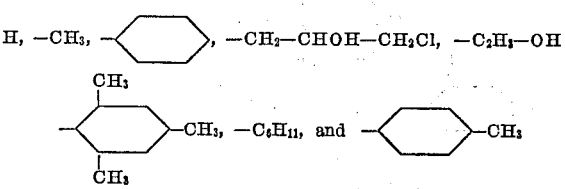

Z is a member selected from the group consisting of

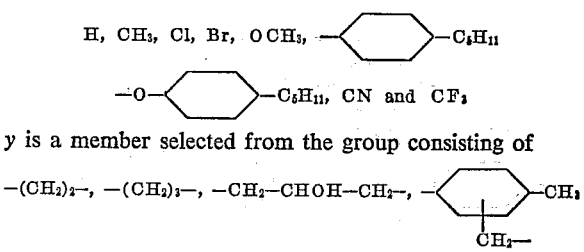

y is a member selected from the group consisting of

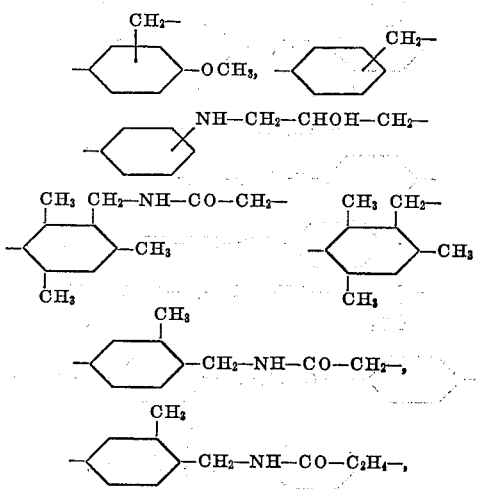

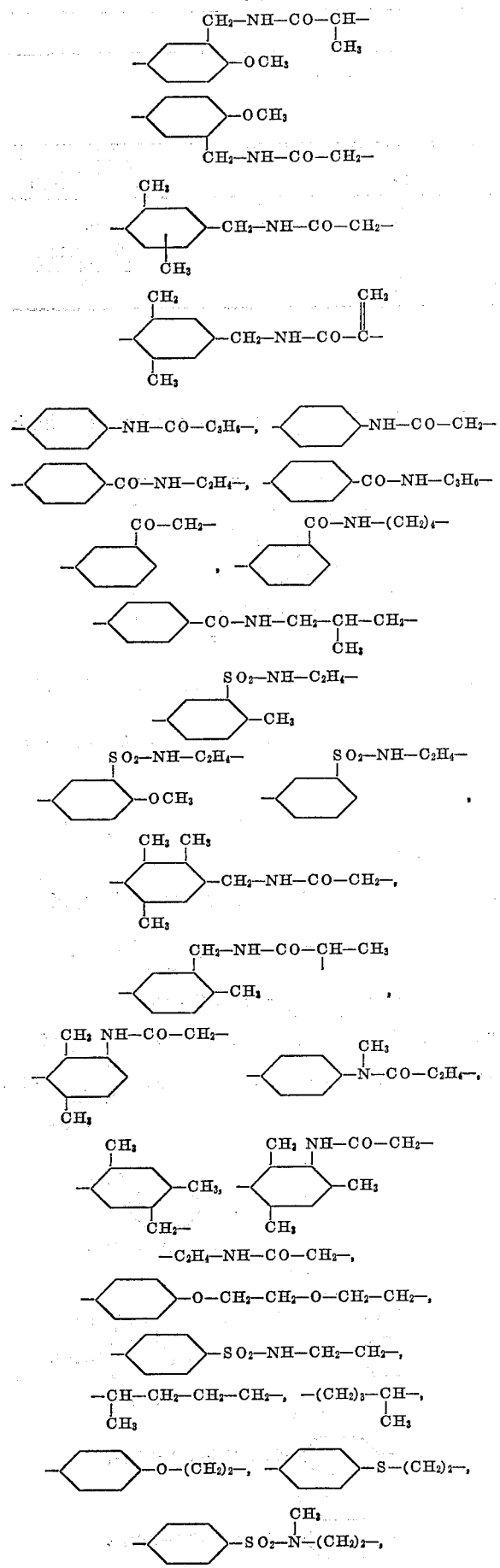

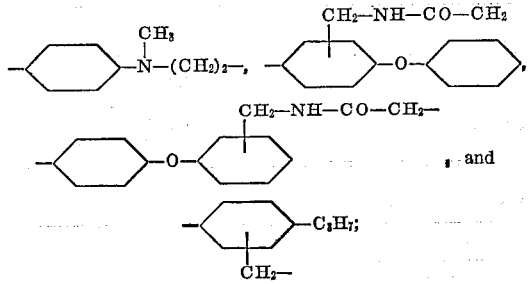

$R_1$ stands together with $R_2$ and with the adjacent N-atom, for a member selected from the group consisting of pyrrolidino, piperidino, morpholino and 1,3,4-triazolo,
$R_2$ stands together with $R_1$ and with the adjacent N-atom for a member selected from the group consisting of pyrrolidino, piperidino, morpholino and 1,3,4-triazolo,
$R_3$ is a member selected from the group consisting of hydrogen, methyl and ethyl,
$R_4$ is a member selected from the group consisting of hydrogen, methyl and ethyl
and
X denotes an organic or inorganic anion equivalent to which satisfies the valence of the dyestuff anion.

2. A basic dye according to claim 1, said basic dye being of the formula

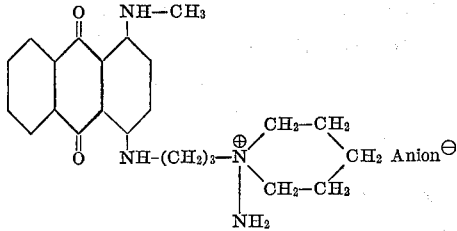

3. A basic dye according to claim 1, said basic dye being of the formula

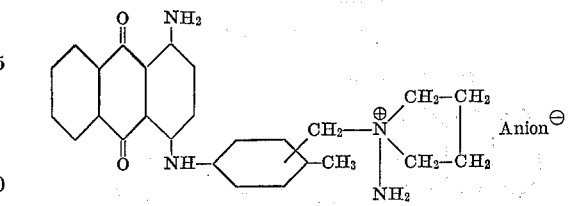

4. A basic dye according to claim 1, said basic dye being of the formula

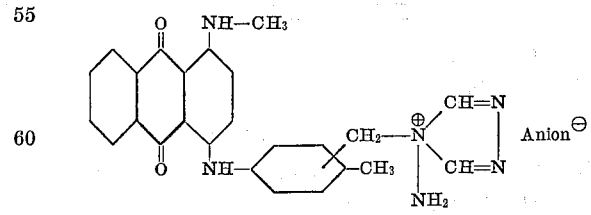

5. A basic dye according to claim 1, said basic dye being of the formula

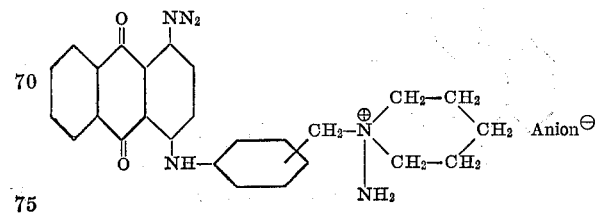

6. A basic dye according to claim 1, said basic dye being of the formula
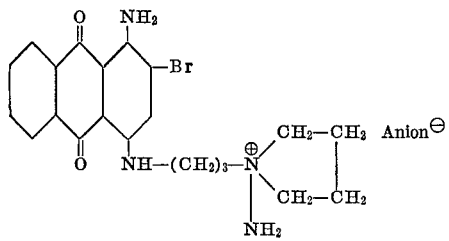
References Cited
UNITED STATES PATENTS
2,955,108 10/1960 Omietanski _____ 260—391
3,123,605 3/1964 Turetzky et al. _____ 260—378
HENRY R. JILES, Primary Examiner
S. D. WINTERS, Assistant Examiner
U.S. Cl. X.R.
260—326.3, 326.5, 294, 293.4, 293.6, 239.8, 239.9, 247.1, 247.2, 247.5, 308